(12) United States Patent
Menges

(10) Patent No.: US 7,880,323 B2
(45) Date of Patent: Feb. 1, 2011

(54) WIND GENERATOR SYSTEM

(76) Inventor: Pamela A. Menges, 2196 W. North Bend Rd., Cincinnati, OH (US) 45239

( * ) Notice: Subject to any disclaimer, the term of this patent is extended or adjusted under 35 U.S.C. 154(b) by 111 days.

(21) Appl. No.: 11/810,401

(22) Filed: Jun. 5, 2007

(65) Prior Publication Data

US 2007/0284885 A1    Dec. 13, 2007

(51) Int. Cl.
F03G 3/00 (2006.01)
F03D 7/00 (2006.01)
(52) U.S. Cl. ...................................................... 290/55
(58) Field of Classification Search ............... 290/44, 290/55
See application file for complete search history.

(56) References Cited

U.S. PATENT DOCUMENTS

| | | | | |
|---|---|---|---|---|
| 222,256 | A * | 12/1879 | Deewes ........................ 415/155 |
| 273,642 | A * | 3/1883 | Toomes ........................ 415/4.2 |
| 2,230,526 | A * | 2/1941 | Claytor ........................ 290/44 |
| 2,484,197 | A * | 10/1949 | Veldhuis ...................... 290/44 |
| 2,844,960 | A * | 7/1958 | Staros .......................... 73/181 |
| 3,042,371 | A * | 7/1962 | Fanti ...................... 416/132 R |
| 3,426,214 | A * | 2/1969 | O'Malley .................... 290/55 |
| 3,621,930 | A * | 11/1971 | Dutchak .................... 180/65.3 |
| 4,030,298 | A * | 6/1977 | Sandoval ...................... 60/527 |
| 4,057,270 | A * | 11/1977 | Lebost ........................ 290/54 |
| 4,084,918 | A * | 4/1978 | Pavlecka ........................ 415/1 |
| 4,109,465 | A * | 8/1978 | Plen .............................. 60/398 |
| 4,161,169 | A * | 7/1979 | Brussels et al. ............. 126/605 |
| 5,463,257 | A * | 10/1995 | Yea .............................. 290/55 |
| 6,465,902 | B1 * | 10/2002 | Beauchamp et al. .......... 290/55 |
| 6,638,005 | B2 * | 10/2003 | Holter et al. ................. 415/4.2 |
| 6,717,284 | B2 * | 4/2004 | Lin .............................. 290/53 |
| 6,777,610 | B2 * | 8/2004 | Yamada et al. ............. 136/251 |
| 6,781,284 | B1 * | 8/2004 | Pelrine et al. ............... 310/330 |
| 6,984,899 | B1 * | 1/2006 | Rice ............................. 290/44 |
| 7,215,037 | B2 * | 5/2007 | Scalzi ........................ 290/55 |
| 7,230,348 | B2 * | 6/2007 | Poole .......................... 290/55 |
| 7,242,108 | B1 * | 7/2007 | Dablo ......................... 290/55 |
| 7,323,791 | B2 * | 1/2008 | Jonsson ....................... 290/55 |
| 7,453,167 | B2 * | 11/2008 | Gilbert ....................... 290/55 |
| 7,453,168 | B2 * | 11/2008 | Lanie ......................... 290/55 |

(Continued)

FOREIGN PATENT DOCUMENTS

DE          4039203 A1 *    2/1992

(Continued)

OTHER PUBLICATIONS

Computer Translation of JP2000-161196A Published Jun. 13, 2000.*

Primary Examiner—Joseph Waks
(74) Attorney, Agent, or Firm—Mark F. Smith; Smith Brandenburg Ltd

(57) ABSTRACT

A new and novel wind generator system particularly suitable for small wind applications that harnesses low velocity wind effectively. In a preferred embodiment, the wind generator system has a drive shaft; a plurality of blades attached to the drive shaft and extending radially outwardly therefrom; a generator assembly coupled to the drive shaft and effective for generating electrical power; and a housing having an inner chamber for receiving the plurality of blades and a wind directional apparatus that operates to adjust the speed of the wind and to channel wind along a desired flow pathway towards the plurality of blades.

22 Claims, 23 Drawing Sheets

U.S. PATENT DOCUMENTS

| | | | |
|---|---|---|---|
| 2001/0048089 A1 * | 12/2001 | Clark et al. | 251/129.11 |
| 2003/0218337 A1 * | 11/2003 | Lin | 290/42 |
| 2004/0160059 A1 * | 8/2004 | Pandian | 290/1 R |
| 2007/0267874 A1 * | 11/2007 | Taylor et al. | 290/55 |
| 2009/0146432 A1 * | 6/2009 | Ballena | 290/55 |
| 2010/0032954 A1 * | 2/2010 | Law | 290/55 |

FOREIGN PATENT DOCUMENTS

| | | | |
|---|---|---|---|
| DE | 4322058 A1 * | 2/1994 |
| DE | 19530253 A1 * | 11/1996 |
| DE | 19623055 A1 * | 1/1997 |
| DE | 10010258 A1 * | 6/2001 |
| FR | 2899651 A1 * | 10/2007 |
| GB | 2072756 A * | 10/1981 |
| JP | 11125171 A * | 5/1999 |
| JP | 2000161196 A * | 6/2000 |

* cited by examiner

WIND GENERATOR SYSTEM

TECHNICAL FIELD

The present invention is directed to power generation and, more particularly, to wind generator systems effective for generating electric power during low wind conditions and in urban or built environments.

BACKGROUND OF THE INVENTION

In recent years the need for alternative sources of electrical energy has grown significantly as a result of increased and uncertainty in oil prices, growing environmental concerns, and the lack of sufficient alternative energy supplies. Accordingly, wind generator systems have gained support as an alternate energy source. Wind generators have been shown to provide a safe and clean source of electric power. Systems, such as large or big wind generators, have been developed having large blades (often more that 18 feet in length) mounted on high towers that can produce more than 35 kilowatts (kW) of power with wind speeds of 20 knots. Such systems are typically used in combination with other wind generators, such as along coastal areas for providing electrical power directly to power grids. Such systems have also been used in rural areas, such as farms, for providing supplemental power or reducing electrical costs.

Small wind generators mounted on smaller towers have also been developed for use such as for residential application and have been used as remote or distributed power sources. Such systems are often connected to the main electric service to the home thereby allowing sufficient powering of the home and for sending excess power generated by the wind generator back to the power grid. Typically, theses small wind generators rotate at speeds that vary with wind speed and have a plurality of blades that drive a rotor coupled to a gearbox that operates to increase the rotation speed of a generator for producing electric power.

In order to reduce maintenance and increase efficiency, systems have been developed having relatively large synchronous ring generators that permit the rotor to be directly coupled to the generator without the need of a gearbox. Unfortunately, while such systems have reduced maintenance costs and have increased the efficiency of the systems, wind generator systems continue to suffer from relatively significant maintenance costs. Further, forces being exerted to the systems due to wind increase in proportion to the cube of wind speed. Accordingly, high wind speeds often encountered by small wind generator systems, even if only occasional or momentary, can damage system components. This is particularly true for wind generators having relatively large blades such as typically required for small wind generators that depend on the relatively large blades to harvest lower-energy winds. Thus, small wind generator systems are typically designed having means for preventing system damage due to such high speed winds. Such means include blade pitching, airfoil spoilers, blade tip breaks, and the like. Means such as braking means or means that act upon the entire blade apparatus rather than on individual blades have also been developed. Unfortunately, all such means significantly add to the complexity and expense of the wind generator systems and significantly add to their maintenance down time and costs. In addition, systems having such means typically require routine maintenance which significantly increases their operating costs. This is particularly true when parts or components must be repaired or replaced which often requires significant rebuild or major dismantling of the system to replace a component. Further, during operation, such means often result in significant power drops or the cessation of power generation during such high wind conditions.

Another problem associated with small wind generators is that they are often acoustically noisy and are undesirable for many residential applications. Further, small or low wind generator systems for mounting to building structures are generally not aesthetically pleasing, often require extensive building modifications, and are prohibited under many building codes.

Accordingly, due to the complexity of many wind generators used in small wind or distributed power the need for a simple modular and easy to maintain generator is significant in not just reducing cost to the consumer but in the cost of manufacture and maintenance.

Consequently, a need exists for a small wind generating system that has reduced cyclic cost, increased reliability and improved maintenance needs and costs, that is acoustically and aesthetically acceptable for residential operation, and which is relatively inexpensive to manufacture and install.

SUMMARY OF THE INVENTION

The present invention is a new and novel wind generator system particularly suitable for small wind applications that harnesses low velocity wind effectively. In a preferred embodiment of the invention, the wind generator system comprises a drive shaft; a plurality of blades attached to the drive shaft and extending radially outwardly therefrom; a generator assembly coupled to the drive shaft and effective for generating electrical power; and a housing having an inner chamber for receiving the plurality of blades and a wind directional apparatus that operates to adjust the speed of the wind and to channel wind along a desired flow pathway towards the plurality of blades.

In another preferred embodiment of the invention the wind generator system comprises means for sensing the direction and speed of wind at the location of the housing.

In another preferred embodiment of the invention the wind generator system comprises sensing means for monitoring the electrical power output of the wind generator system.

In another preferred embodiment of the invention the wind generator system comprises sensing means for monitoring the operational efficiency and condition of the wind generator system.

In another preferred embodiment of the invention the wind generator system comprises a communication and control means coupled to the sensing means whereby the communication and control means can communicate with an outside monitoring system.

In another preferred embodiment of the invention the communication and control means of one wind generator system can communicate with the communication and control means of another wind generator system.

In another preferred embodiment of the invention the blades comprise an aerodynamic adjustment element for adjusting the aerodynamic characteristic of the blades.

In another preferred embodiment of the invention the aerodynamic element is a thin film material.

In another preferred embodiment of the invention the aerodynamic element is a metallic composite coating.

In another preferred embodiment of the invention the aerodynamic element is formed from a shaped memory alloy.

In another preferred embodiment of the invention the shaped memory alloy is Nitinol.

In another preferred embodiment of the invention the wind generator comprises a pulley apparatus having a loop coupled to the drive shaft; and means for creating a temperature differential along a portion of the loop; wherein the loop is effective for increasing the rotational speed of the drive shaft when acted upon by the means for creating a temperature differential along a portion of the loop.

In another preferred embodiment of the invention the loop is formed from a shaped memory alloy.

In another preferred embodiment of the invention the blades comprise a photovoltaic substrate operable for generating electrical power.

In another preferred embodiment of the invention the photovoltaic substrate operates in response to infrared light.

In another preferred embodiment of the invention the wind directional apparatus comprises a plurality of rotatable slats.

Another preferred embodiment of the invention, a wind generator system comprises at least two stages of blades mounted to a drive shaft; each stage having at least one blade attached thereto and extending radially outwardly therefrom; a generator assembly coupled to the drive shaft and effective for generating electrical power; and a housing having an inner chamber for receiving each stage of at least one blade and a wind directional apparatus that operates to adjust airflow and to channel the wind along a desired flow pathway towards each of at least one blade.

In another preferred embodiment the wind generator system comprises rotatable slats having images thereon that change when the slats rotate.

In another preferred embodiment of the invention the housing includes a rotatable base that operates to rotate the wind generator system to optimize power generation.

In another preferred embodiment of the invention the individual components of the wind generator system are grouped into individual modules that can be easily installed or removed into the wind generator system.

In another preferred embodiment of the invention the housing of the wind generator system can be incorporated into a structure.

In another preferred embodiment of the invention the wind generator system comprises a wire or band formed from a shaped memory alloy and effective for increasing the rotational speed of the drive shaft.

In another preferred embodiment of invention the wind generator system comprises and energy storage system.

In another preferred embodiment of the invention the energy storage system is a hydraulic or pressurized fluid storage system.

In another preferred embodiment of the invention the energy storage system is a bellows storage system.

In another preferred embodiment of the invention the energy storage system is a combination of hydraulic and bellows storage systems.

In another preferred embodiment of the invention the energy storage system is a combination storage system comprising hydraulic, bellows and battery storage systems.

These and other features, aspects, and advantages of the present invention will become better understood with regard to the following description, appended claims, and accompanying drawings.

BRIEF DESCRIPTION OF THE DRAWINGS

To provide a more complete understanding of the present invention and further features and advantages thereof, reference is now made to the following description taken in conjunction with the accompanying drawings, in which:

FIG. 19 is a schematic illustration of another embodiment of the wind generator system having a housing comprising stands, rack mounting structures for equipment, and the like;

DETAILED DESCRIPTION OF THE INVENTION

Figure 1:
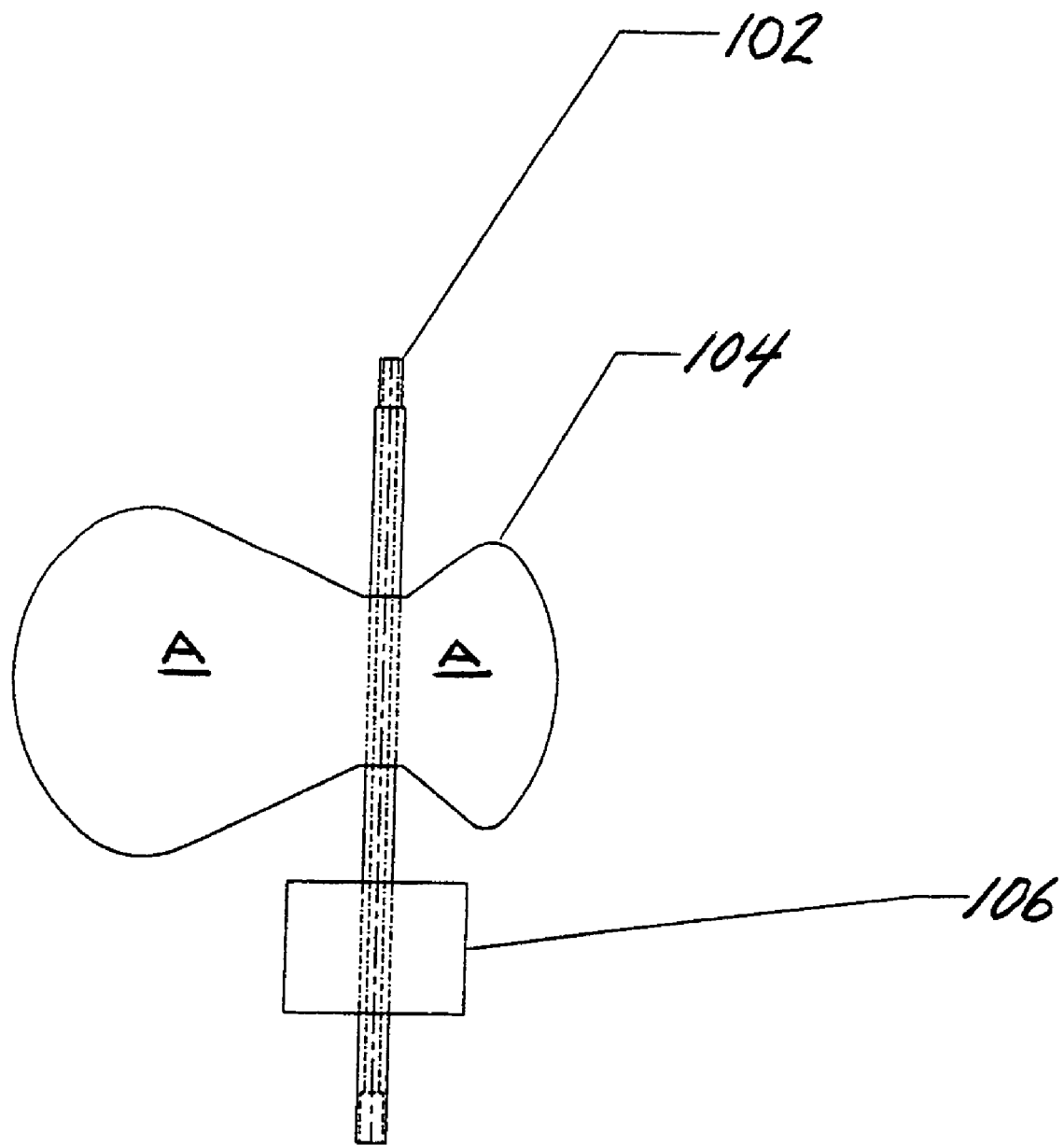
FIG. 1 is a schematic illustration of a portion of the wind generator system of the subject invention showing an end view of blades mounted to a drive shaft.

The present invention relates to a low or small wind generator system. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Figure 2:
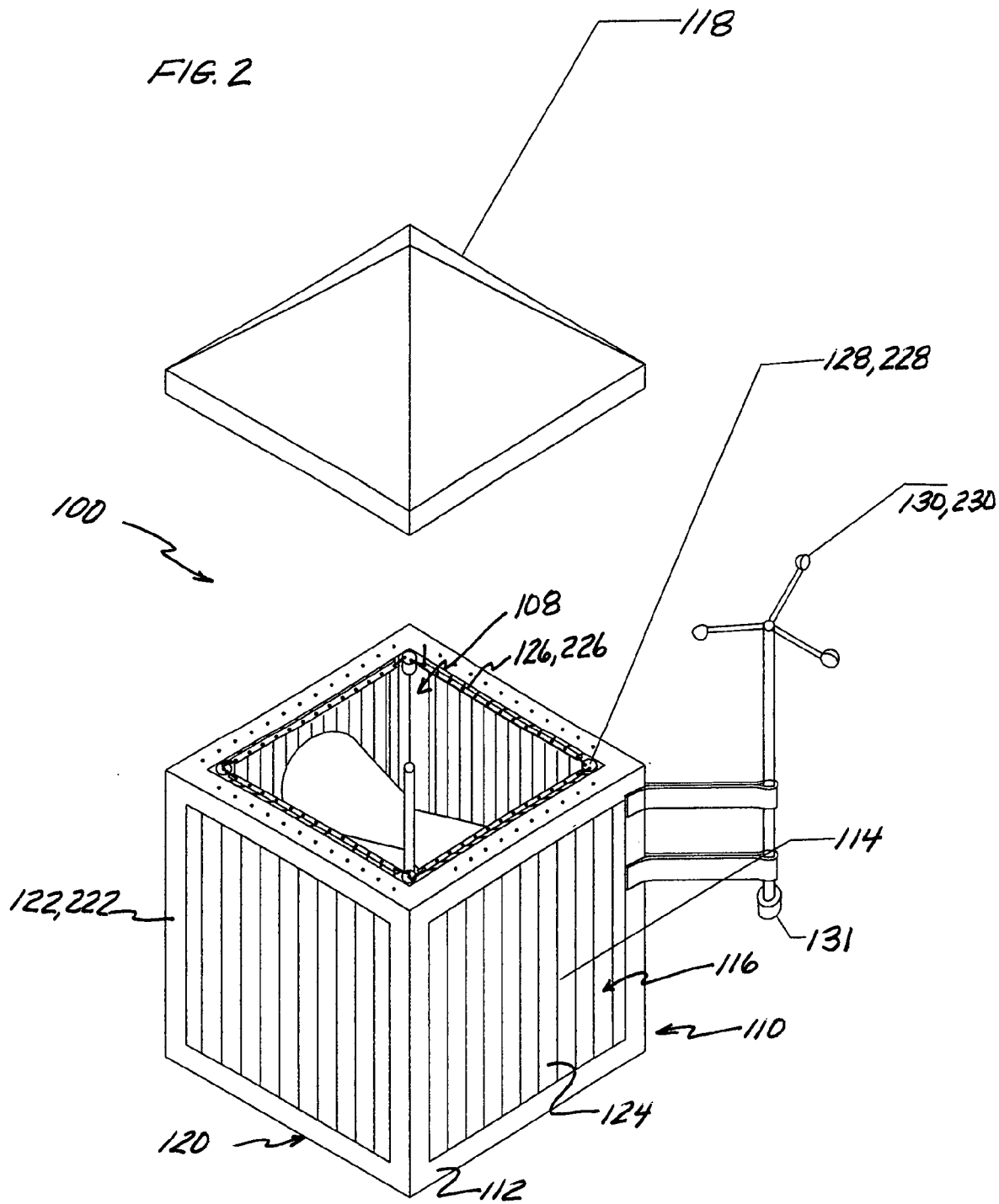
FIG. 2 is a perspective schematic partially exploded illustration of the wind generator system showing blades mounted to a drive shaft and enclosed within a housing.
Figure 3:
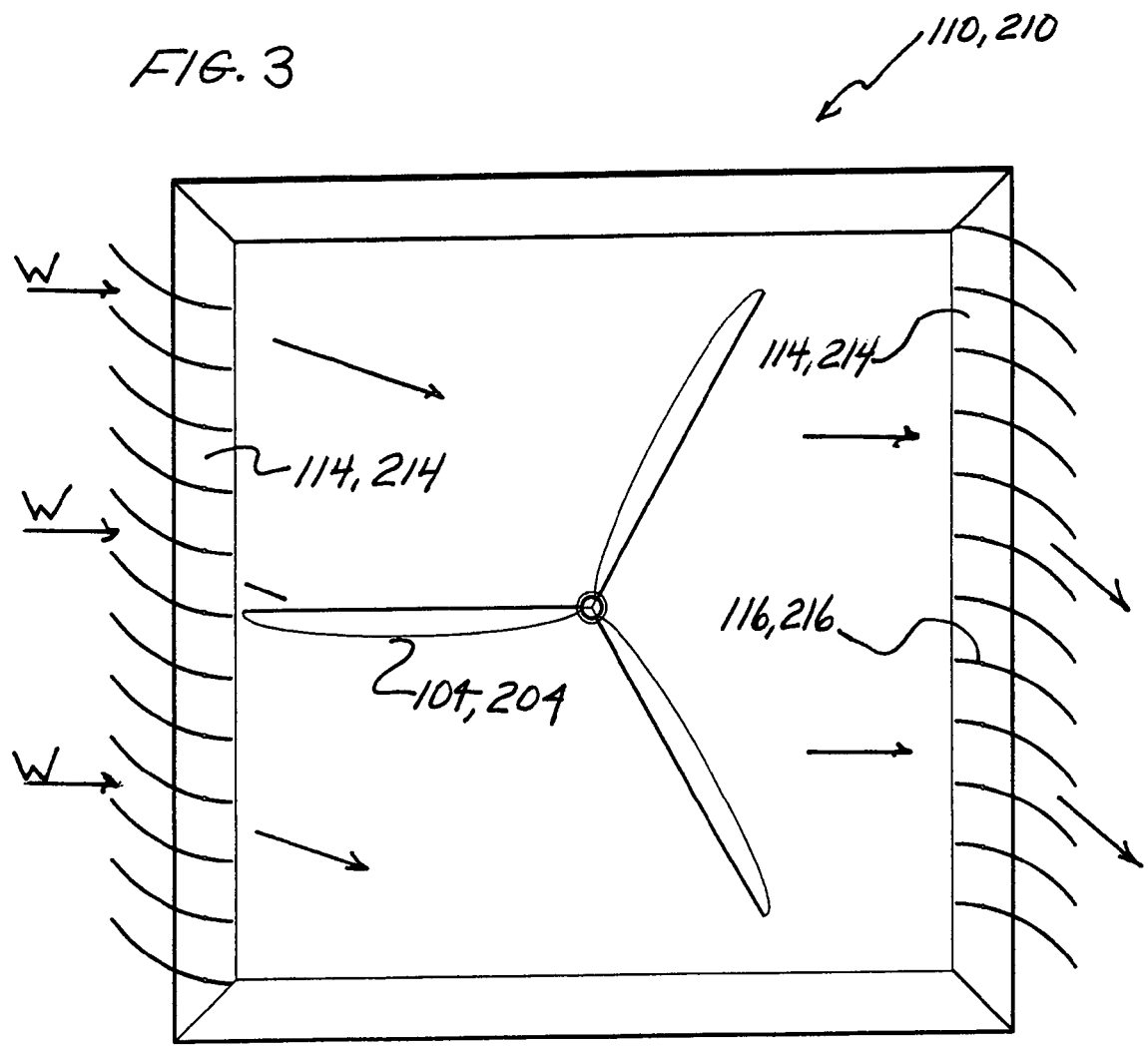
FIG. 3 is a schematic illustration showing wind being directed by the wind directional apparatus that operates to adjust wind speed and to channel wind into the housing through one or more of the openings, along a desired flow pathway towards the blades, and out of the housing through one or more of the openings.
Figure 4:
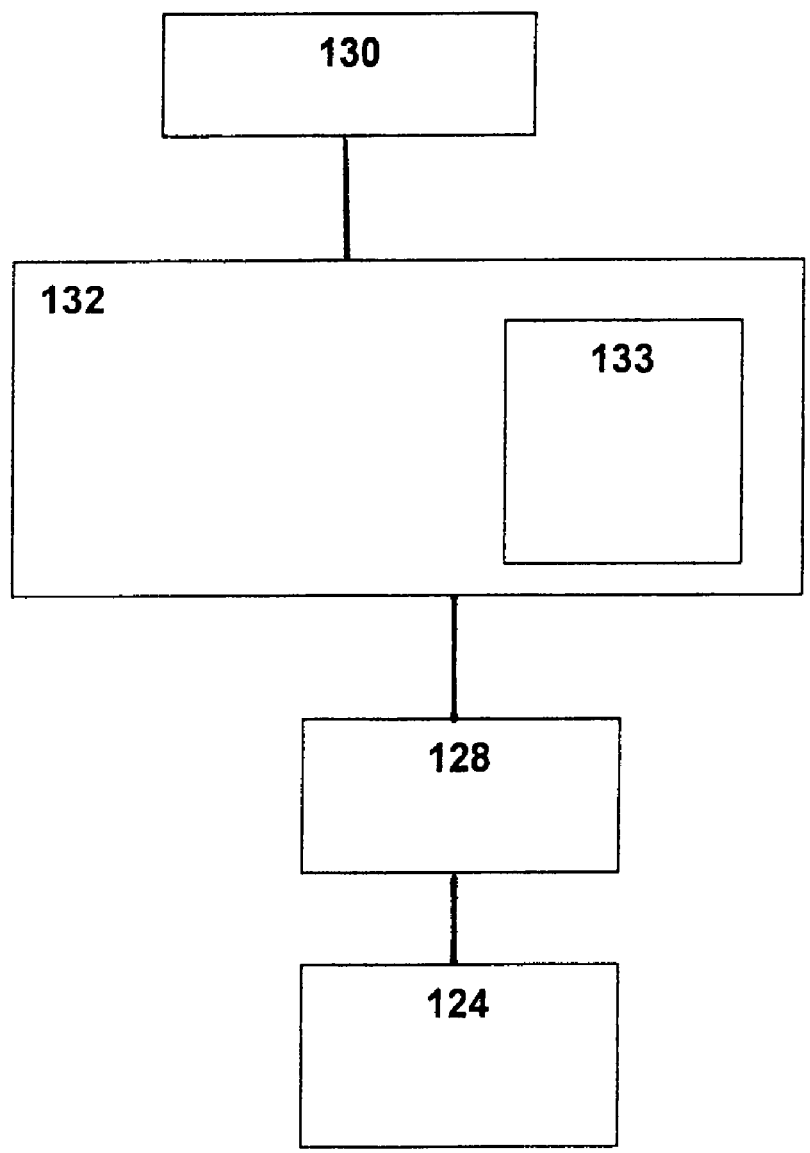
FIG. 4 is an schematic illustration showing the wind speed and direction sensor electrically coupled to a control apparatus having a microprocessor for receiving signals from the wind speed and direction sensor that determines and provides signals to a wind directional apparatus for directing airflow along a desired pathway to properly impinge the blades.

Referring to FIGS. 1 and 2, a preferred embodiment of the wind generator system, generally referred to as 100, is shown comprising a drive shaft 102 and a plurality of blades 104 (two or more) attached to and extending radially outwardly from the drive shaft 102. The drive shaft 102 is operationally coupled to a generator assembly 106 which operates to generate electrical power when actuated by rotation of the drive shaft 102. It should be understood that as used herein the term "generator" includes alternators. In a preferred embodiment as shown, the drive shaft 102 and blades 104 are enclosed within an inner chamber 108 of a housing 110. The housing 110 comprises a frame 112 having openings 114 wherein preferably each opening 114 has a wind directional apparatus 116 that operates to adjust wind speed and to channel wind W (FIG. 3) into the housing through one or more of the openings 114, which operate as air intakes that direct wind along a desired flow pathway towards the blades 104, and out of the housing 110 through one or more of the openings 114 that operate as wind exhausts. Preferably, the housing 110 is generally rectangular in shape having a top or roof 118, a base 120, and vertical sides 122. Preferably, at least one opening 112 is provided on each vertical side 122. In a preferred embodiment, as shown in FIG. 2, the wind directional apparatus 116 comprises a plurality of rotatable slats or louvers 124 that are operationally coupled to control rails 126 that are operated by one or more electric motor and horizontal control units 128 for rotating the slats 124 such as use of conventional bell cranks. It should be understood that the housing 110 is not limited to being rectangular in shape but may have a variety of geometries having various number of vertical sides. For an exemplary illustration, the housing can be formed in the shape of a pentagon. Mounted to the housing 110 is a wind speed and direction sensor or anemometer 130 that operates to detect and measure wind speed and direction at the location of the wind generator system 100. As illustrated in FIG. 4, the wind speed and direction sensor 130 is electrically coupled, such as by wire or by a wireless transmitter 131 (FIG. 2), such as shown, to a control apparatus 132 having a microprocessor 133 that receives signals from the wind speed and direction sensor 130 which then operates to determine and provide signals to the electric motor and control units 128 to rotate the slats 124 to the desired position for directing airflow along a desired pathway to properly impinge the blades 104.

Figure 5:
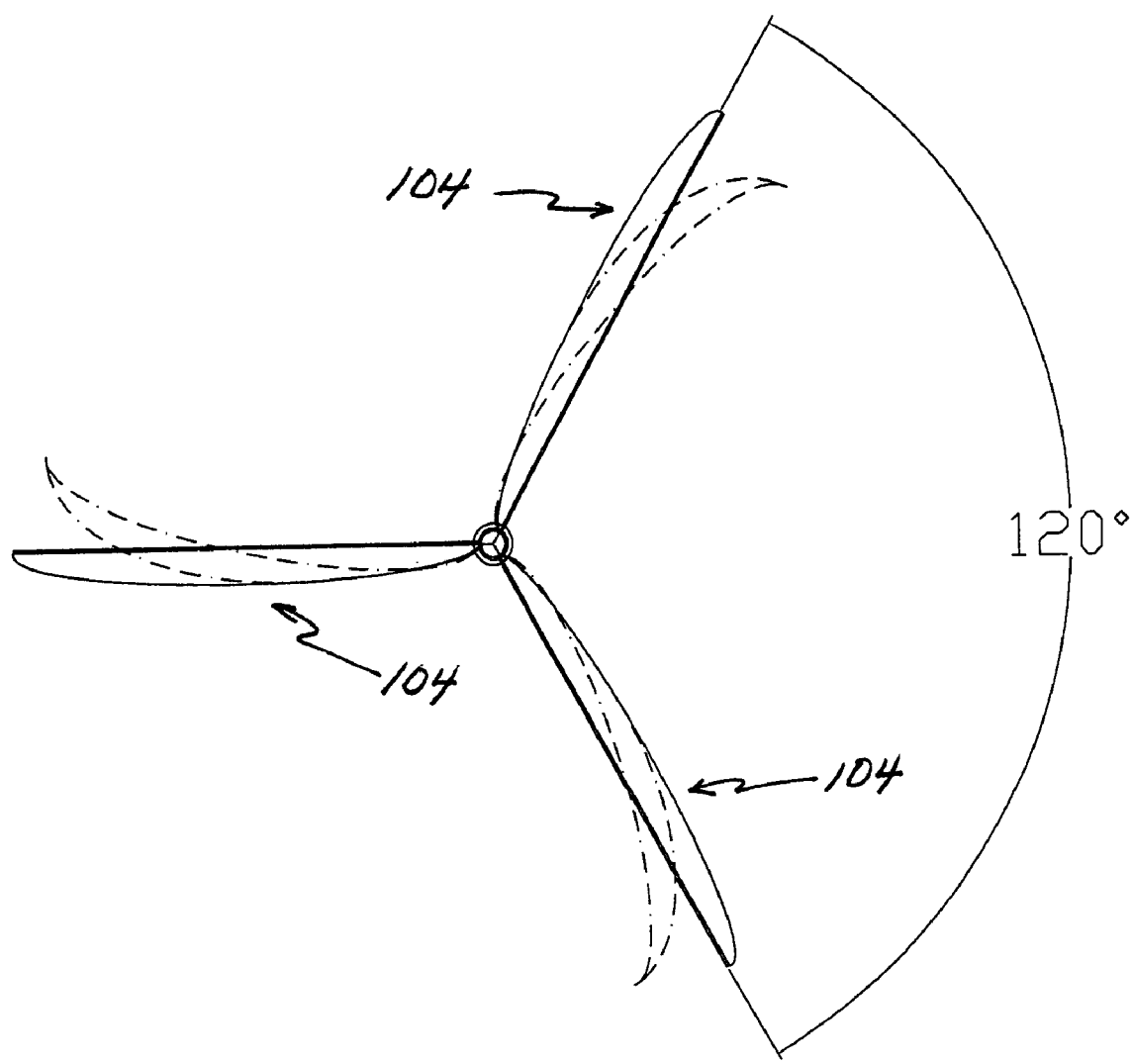
FIG. 5 is a top schematic view illustration showing blades having an aerodynamic adjustment element thereon that operates to increase or decrease the camber of the blades.
Figure 6:
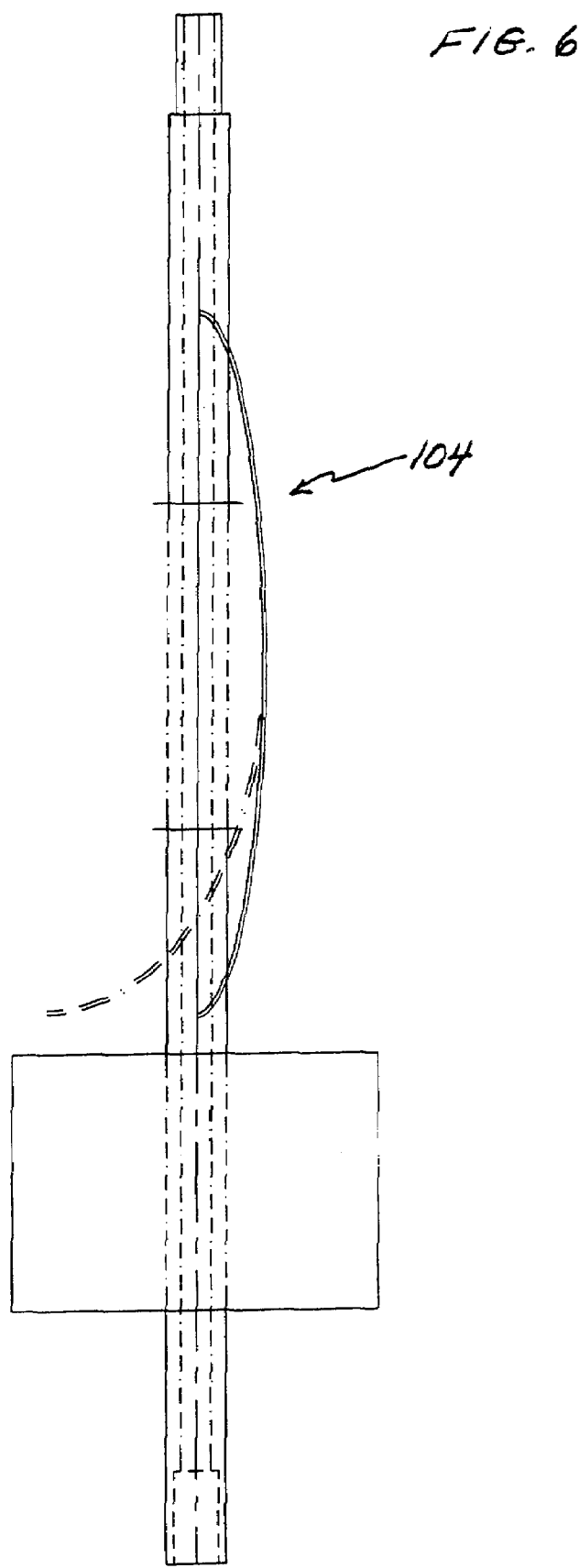
FIG. 6 is a side view illustration showing a portion of a drive shaft and a blade attached thereto and showing a blade being acted upon by the aerodynamic adjustment element of FIG. 5.
Figure 7:
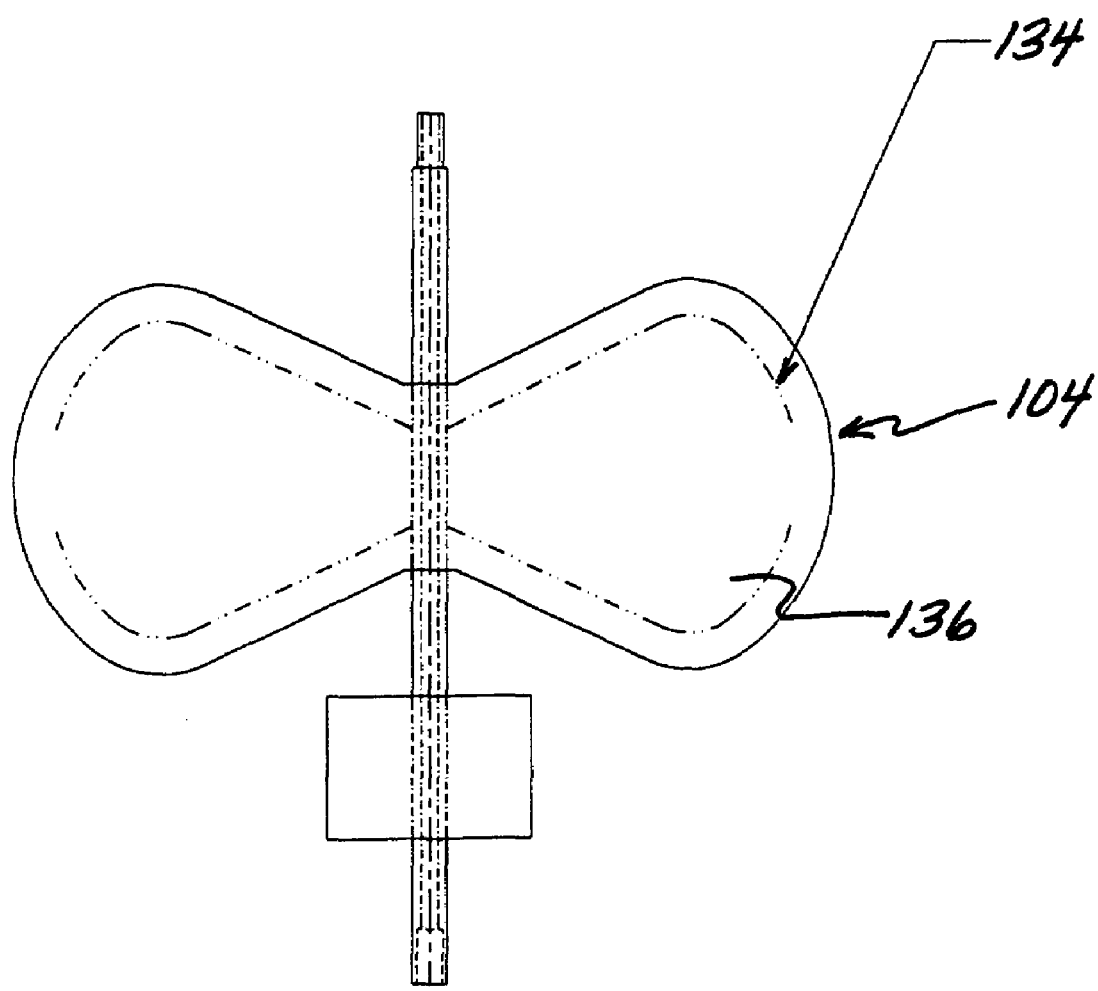
FIG. 7 is a schematic illustration showing blades having an aerodynamic adjustment element comprising a thin film material applied to a portion of one side of each blade.

Referring to FIG. 1, a preferred embodiment of the blades 104 is shown. Preferably each blade 104 has a relatively large surface area A effective for harvesting lower-energy (low wind speed) wind being directed to the blades 104. Referring to FIGS. 5 and 6, another preferred embodiment of the blades 104 is shown whereby the blades 104 include an aerodynamic adjustment element 134 (FIGS. 7 and 8) for adjusting the aerodynamic characteristic of each of the blades 104. In a preferred embodiment, as shown in FIG. 7, the aerodynamic adjustment element 134 comprises a thin film material or wire 136, such as a shaped memory alloy, that operates to increase or decrease the camber of the blades 104 (as shown in FIGS. 5 and 6) for adjusting the aerodynamic characteristic of the blade 104 under a variety of wind speeds. It is known that simple contraction of certain thin film materials can be accomplished such as by running electrical current through carbon fibers on a polyimide sheet. In a preferred embodiment, the thin film material 136 is formed from Nitinol (NiTi) which is a shaped memory alloy having nearly equivalent amounts of nickel and titanium. The physical and mechanical properties of a shaped memory alloy such as Nitinol are dependent on its crystalline structure. For example, the Nitinol crystal structure is very dynamic and highly heat sensitive and when it is deformed in the martensite phase, the crystalline structure is not damaged. Instead the crystal structure transforms moving in a singular crystalline direction. When heated the material returns to the memory or austenite phase, to a state of less stress. The austenite phase is the phase above transition temperature. The transition temperature will vary according to the alloy composition. Most Nitinol alloys, for example, have transition temperatures between 70-130° C. with tensile strength 100,000 psi, melting point of 1,250° C., and resistance 1.25 ohms per inch/0.006 inch wire. In a preferred embodiment, the particular Nitinol alloy found to be suitable is known as FLEXINOL, commercially available by Dynalloy Inc. of Costa Mesa, Calif.

Figure 8:
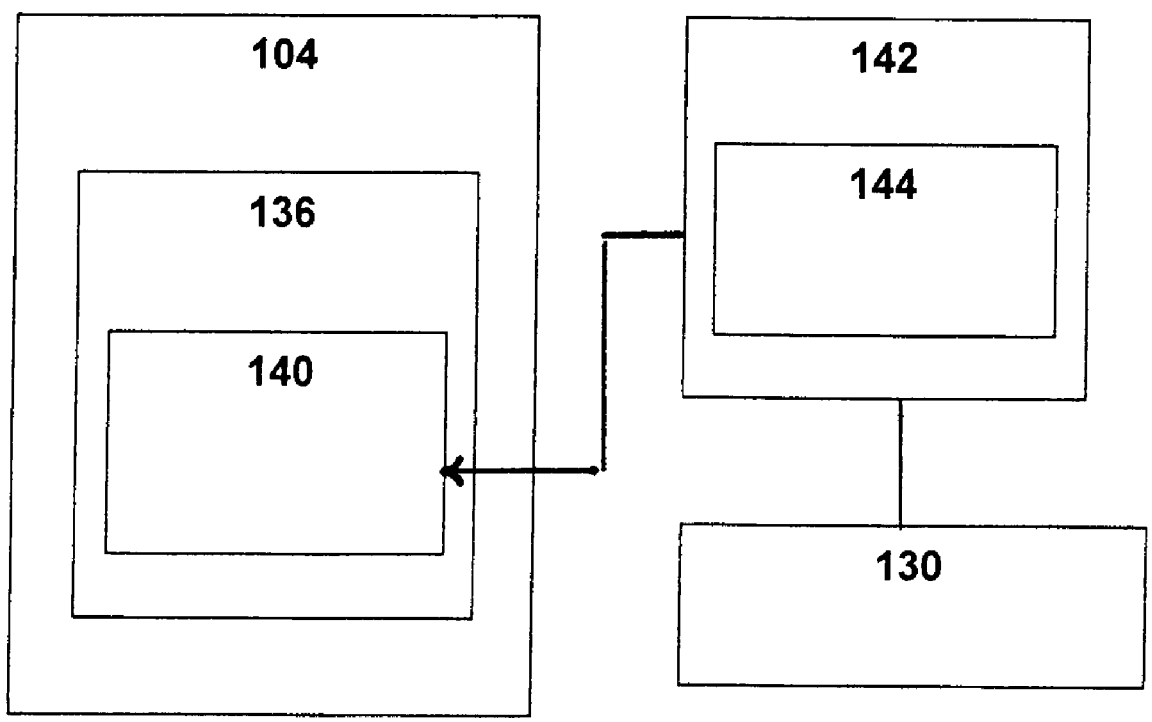
FIG. 8 is a schematic illustration showing the interaction between a blade control unit and a resistant circuit for heating of the film material of FIG. 7 to cause the bending of the blade to increase or decrease its camber thereby adjusting its aerodynamic characteristic.

Preferably, as stated above, the aerodynamic adjustment element 134 may be in the form of an embedded wire, thin film or a metallic coating. Referring to FIG. 7, in a preferred embodiment the aerodynamic adjustment element 134 is shown as a thin film material 136, such as a Nitinol, applied to a portion of one side of each blade 104. As shown, the blade 104 is in its normal operating configuration. Upon heating of the thin film material 136, or an embedded wire, such as by application of electric current through a resistant circuit 140 (FIG. 8) within or along the thin film material 136, the thin film material 136 contracts, as described above, causing the bending of the blade 104 to increase or decrease its camber thereby adjusting its aerodynamic characteristic (FIGS. 5 and 6). Referring to FIG. 8, in order to control the amount of current through the resistant circuit 140 for properly adjusting the aerodynamic characteristic of the blade 104, the wing generator system 100 further comprises a blade control unit 142. In a preferred embodiment, the blade control unit 142 includes a fuzzy logic microprocessor or controller 144 that receives wind speed input from the wind speed and direction sensor or anemometer 130 and uses such information for controlling the amount of electric current, thus heating, or allowing the thin film material 136 (or embedded wire) formed from the shape memory alloy to expand or contract to bend and place the blade 104 into a desired aerodynamic configuration.

Figure 9:
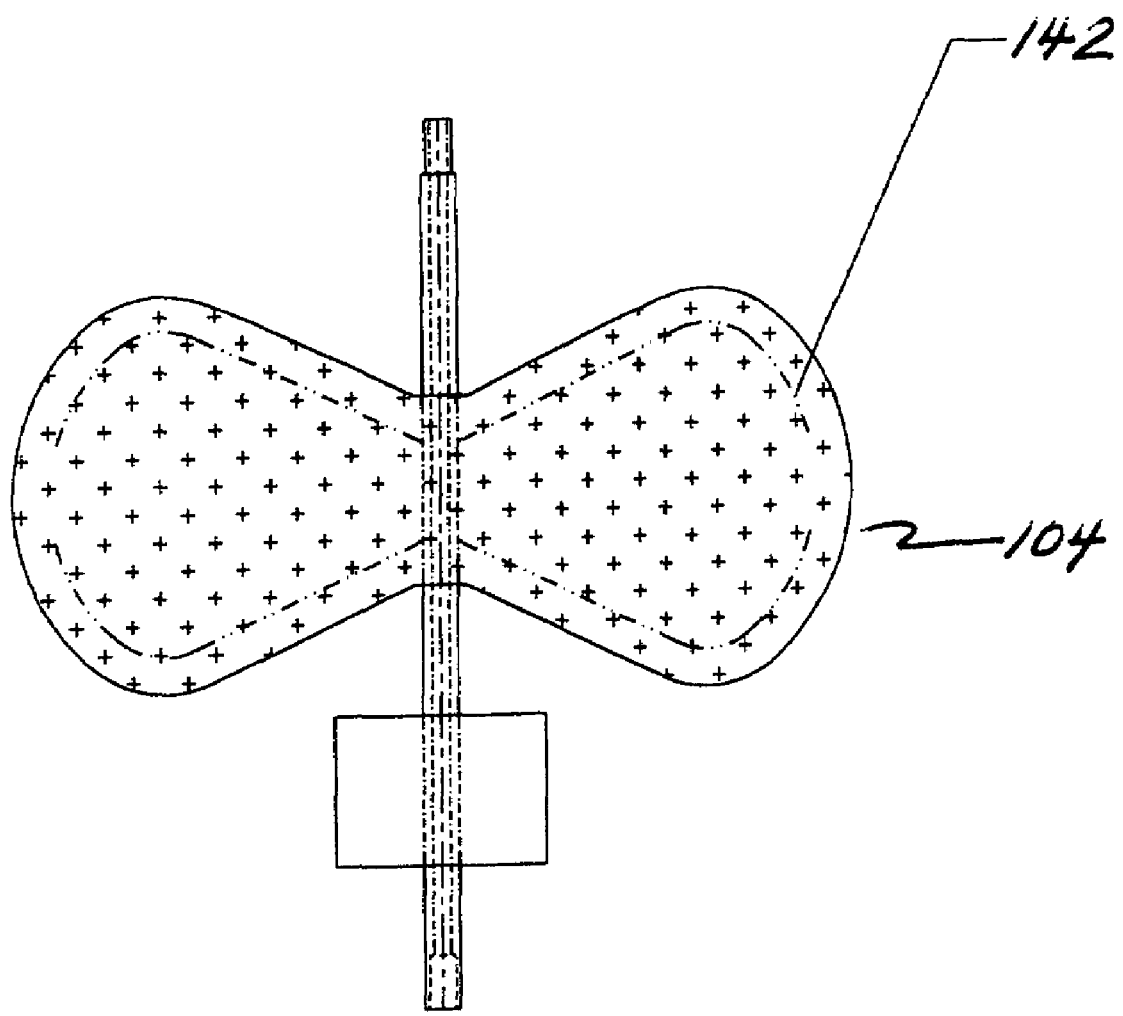
FIG. 9 is a schematic illustration showing another preferred embodiment of a blade control unit for properly adjusting of the aerodynamic characteristic of the blades comprising a neural network.

In another preferred embodiment of the invention, as illustrated in FIG. 9, the blade control unit 142 for properly adjusting of the aerodynamic characteristic of the blades 104 is a neural network (or parallel distributed processing elements (often referred to as nodes, neurons, processing elements, unites)) that work together to control the proper electric current to the resistant circuit 140. It should be understood that the artificial neural network (functional structure) is deposited or embedded onto the surface of the blades 104 and operates for information processing and aerodynamic geometry control of the blades. Referring to FIG. 8, the methodology of the blade control unit is shown whereby signals generated by the wind speed and direction sensor 130 are inputted into the blade control unit 142.

Figure 10:
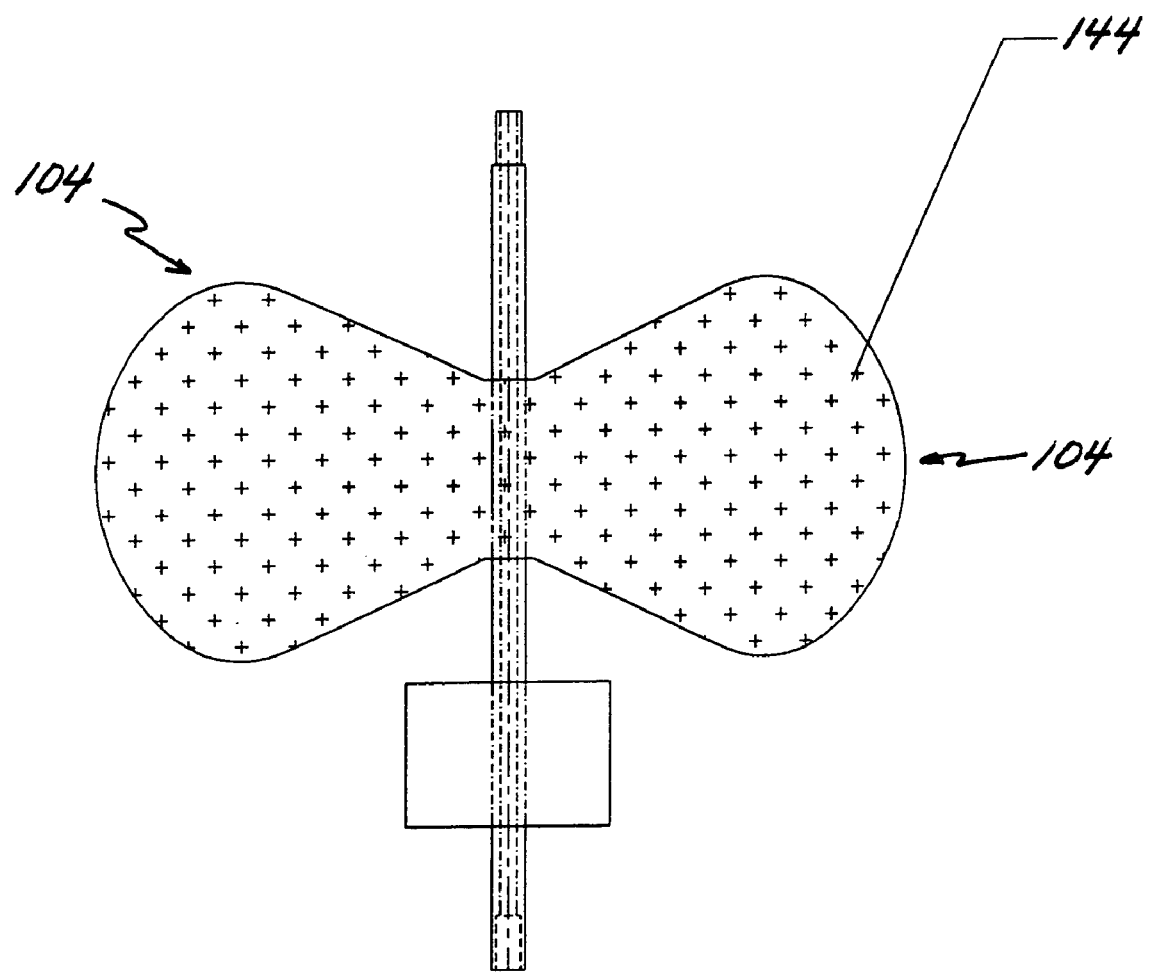
FIG. 10 is a schematic illustration showing blades having a piezo electric material coating applied to one or both sides of the blades.

Referring to FIG. 10, another preferred embodiment of the invention is shown whereby the blades 104 have a light activated photovoltaic film or nanofilm 144 applied to one or both sides of the blades 104. In another preferred embodiment of the invention, one or more portions of the housing 110 (FIG. 2) may be provided with such a light activated photovoltaic film or nanofilm (not shown). Preferably, the photovoltaic films or nanofilms are activated by light in the infrared range. One such nanofilm film has been developed at the University of Toronto having cells of approximately 4 nm and is photoactive in the infrared range of the light spectrum. Using films that are activated by infrared light permits higher power output with less solar radiation, such as during a cloudy day, than with standard ultraviolet (UV) photovoltaic systems. In another preferred embodiment the blades 104 or housing 110 (FIG. 2) may comprise piezo electric material coatings to augment power generation of the wind generator system as well as providing wind speed information by measuring the dynamic pressure of the wind against the surface of the blade.

Figure 11:
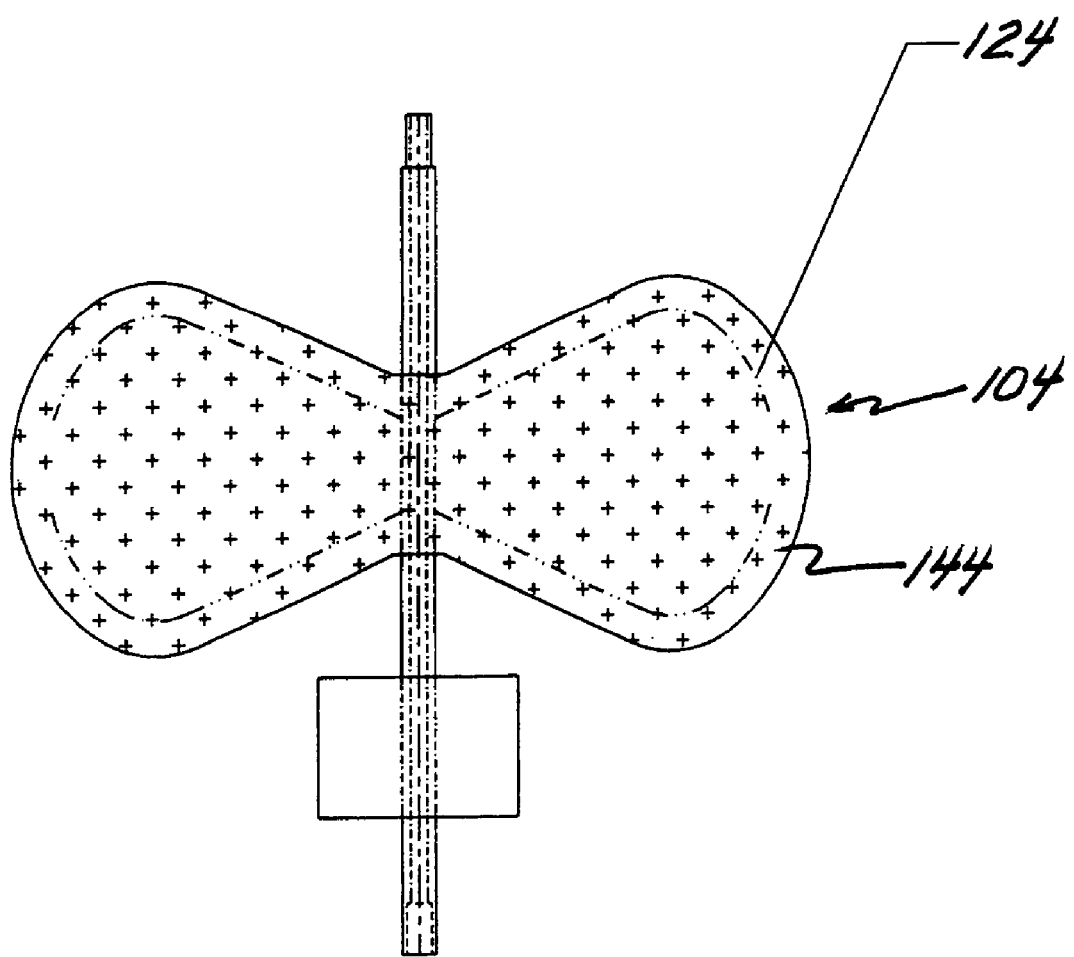
FIG. 11 is a schematic illustration showing blades having both an aerodynamic adjustment element and a piezo electric material coating applied thereto.

In another preferred embodiment, as illustrated in FIG. 11, the blades 104 comprises both the aerodynamic adjustment element 124 and the photovoltaic film 144, as described above.

Figure 12:
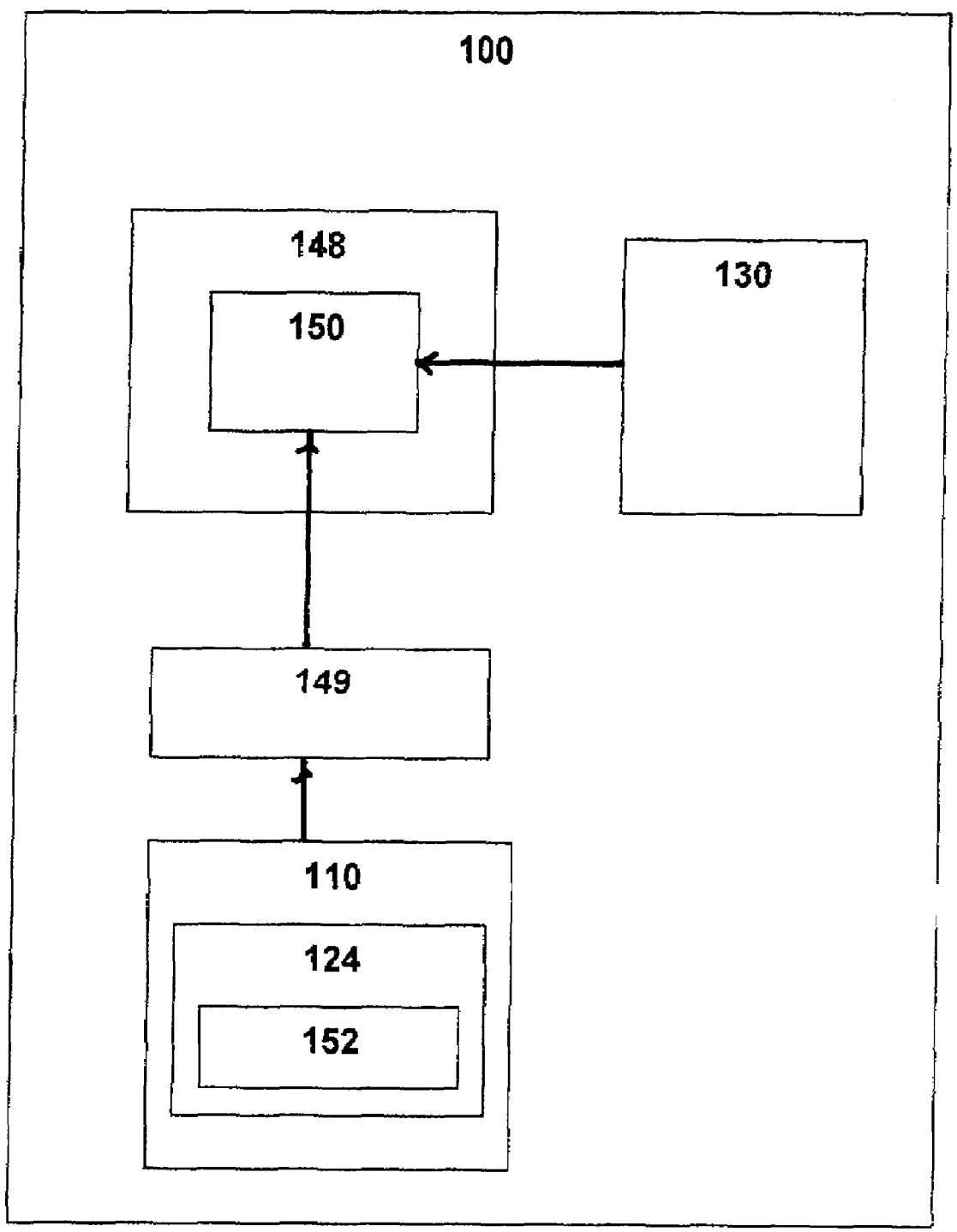
FIG. 12 is a schematic illustration showing a performance monitor for monitoring the performance and efficiency of the wind generator system.

In another preferred embodiment of the invention, as shown in FIG. 12, the wind generator system 100 comprises a performance monitor 148 for monitoring the performance and efficiency of the wind generator system 100 Preferably, the performance monitor 148 comprises a microprocessor 150 effective for receiving signals from the wind speed and direction sensor 130 as well as receiving signals from other component sensors 149 effective for transmitting information from the components comprising the wind generator system 100. In a preferred embodiment, the performance monitor 148 operates to monitor the electrical power output of the wind generator system 100. In another preferred embodiment, the performance monitor 148 comprises a sensor 152 positioned on one or more of the rotatable slats or louvers 124 of housing 110 and operates to sense the actual rotational movement of the slat or louver 124 (FIG. 2). Such information can then be analyzed by the microprocessor 150 to determine if the proper rotational movement of the slat or louver 124 is being performed. It should now be understood that other sensors can be utilized for providing signals to the microprocessor 150 that can be utilized by the microprocessor for determining the efficiency or performance of the various operational components comprising the wind generator system 100.

In another preferred embodiment, the microprocessor 150 can operate to monitor the total power output of the wind generator system 100 to the rotational speed of the blades 104 to determine the health and operation performance of the system 100. For an exemplary illustration, if the power output being generated by the wind generator system is below the level typically generated for the particular wind speed, the system components can be evaluated to determine which particular component is not operating efficiently and the component can be replaced thereby bringing the system efficiency back to its typical level. It should be understood that additional conventional sensors can be incorporated into the wind generator system to monitor the operational efficiency of various components and monitored by the microprocessor. Further, it should now be understood that the microprocessor can be coupled to a conventional transmitter (such as a wireless radio transmitter, the Internet, or other communication system) for transmitting operational data to a remote monitoring device. In this way, individual systems can be monitored as well as for use in obtaining information for use in maintenance and in determining the need for performance enhancement modifications.

Figure 13:
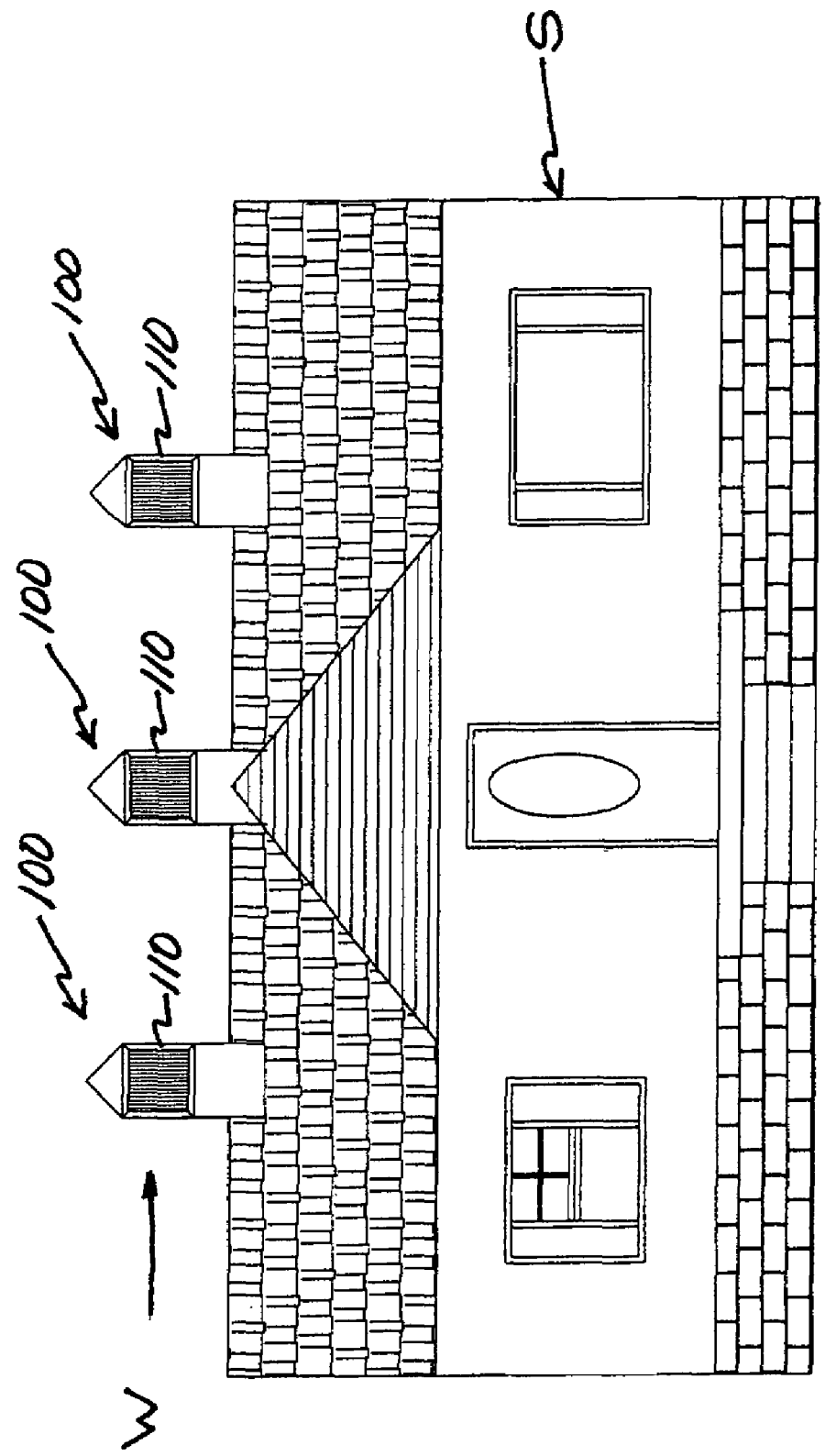
FIG. 13 is a schematic illustration showing a wind generator system attached to a structure, such as the roof of a building.

Referring to FIG. 13, one or more wind generator systems 100 are shown mounted to a structure S, such as a wall, roof, platform, or the like and are can also be incorporated architecturally into the structure S. In addition, as should now be understood, that the wind generator system 100 having a housing 110 described above reduces operational noise levels and reduces the likelihood of injury to wildlife, such as birds. As shown, wind W, is blowing in a first direction, the wind speed and direction is monitored and sensed using the wind speed and direction sensor 130 (FIG. 2). The wind speed and direction sensor 130 transmits a signal to the control apparatus 132 such that the microprocessor 133 (FIG. 4) receives the signal and determines and provides signals to the electric motor and control units 128 to rotate the slats 124 to the desired position for directing airflow along a desired pathway to properly impinge the blades 104 (FIG. 2). It should now be apparent that if the wind speed and direction sensor 130 detects wind speed or a wind gust greater than the safe or operational wind speed for the particular wind generator system the system operates such that the slats 124 will rotate to slow down and/or redirect the wind so that the velocity of the wind is within acceptable operating parameters. It should also be apparent that in another preferred embodiment of the invention the aerodynamic adjustment element 134 (FIGS. 7, 8 and 9) can be used to adjust the aerodynamic characteristics of the blades to allow them to accommodate the high wind speed. It should be apparent that unlike many prior art systems, the wind generator system of the subject application can operate under a variety of wind conditions from small wind to high wind conditions without the need of mechanical breaking systems or gearing systems.

Figure 14:
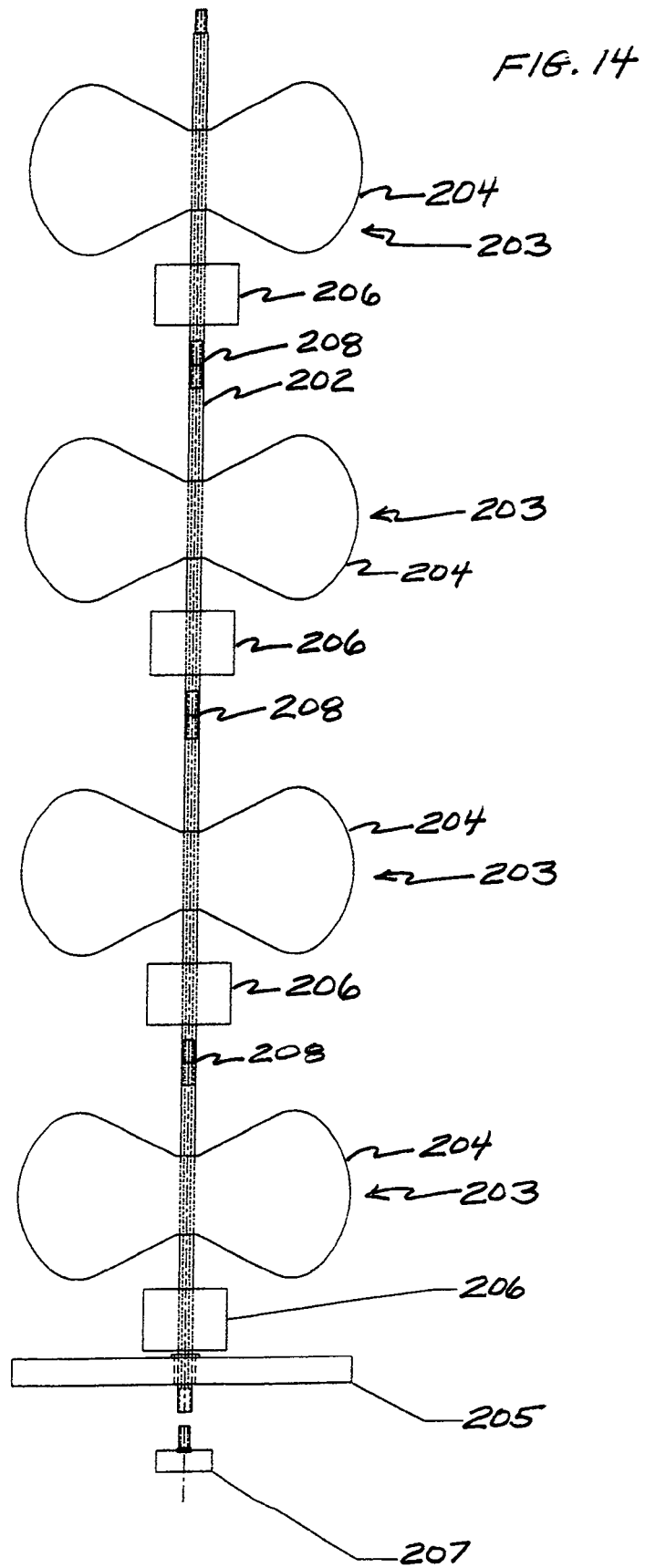
FIG. 14 is a schematic illustration showing another preferred embodiment of the invention showing the wind generator system comprising a plurality of aligned or stacked blades mounted to a drive shaft.

Referring to FIG. 14, another preferred embodiment of the invention is shown whereby the wind generator system comprises a single drive shaft 202 or a series of shafts mounted together such as by couplings 208, as shown, and a one or more stages of blades 203, each stage 203 having one or more blades 204 attached to and extend radially outwardly from the drive shaft 202. It should be understood that the blade stages can be arranged in a horizontal or vertical arrangement. The drive shaft 202 is operationally coupled to a generator assembly 206 or a plurality of generator assemblies 206 (as shown) which operate to generate electrical power when actuated by rotation of the drive shaft 202. Preferably, the drive shaft 202 is formed from a light aircraft grade rolled or extruded aluminum and is tubular having an inner channel 203 that provides a chase for allowing a power bus, control cables and the like to travel to the various stages, controls, and actuators and other similar electronic devices. The drive shaft 202 is supported by a frame 205 and one or more bearing assemblies 207. It should be understood that the individual stages can be modular and assembled together by use of a rotating coupling placed in series of the individual stages, as shown. It should also be understood that the individual generators can be mounted in series to the drive shaft or the drive shaft can be coupled to a single generator.

Figure 15:
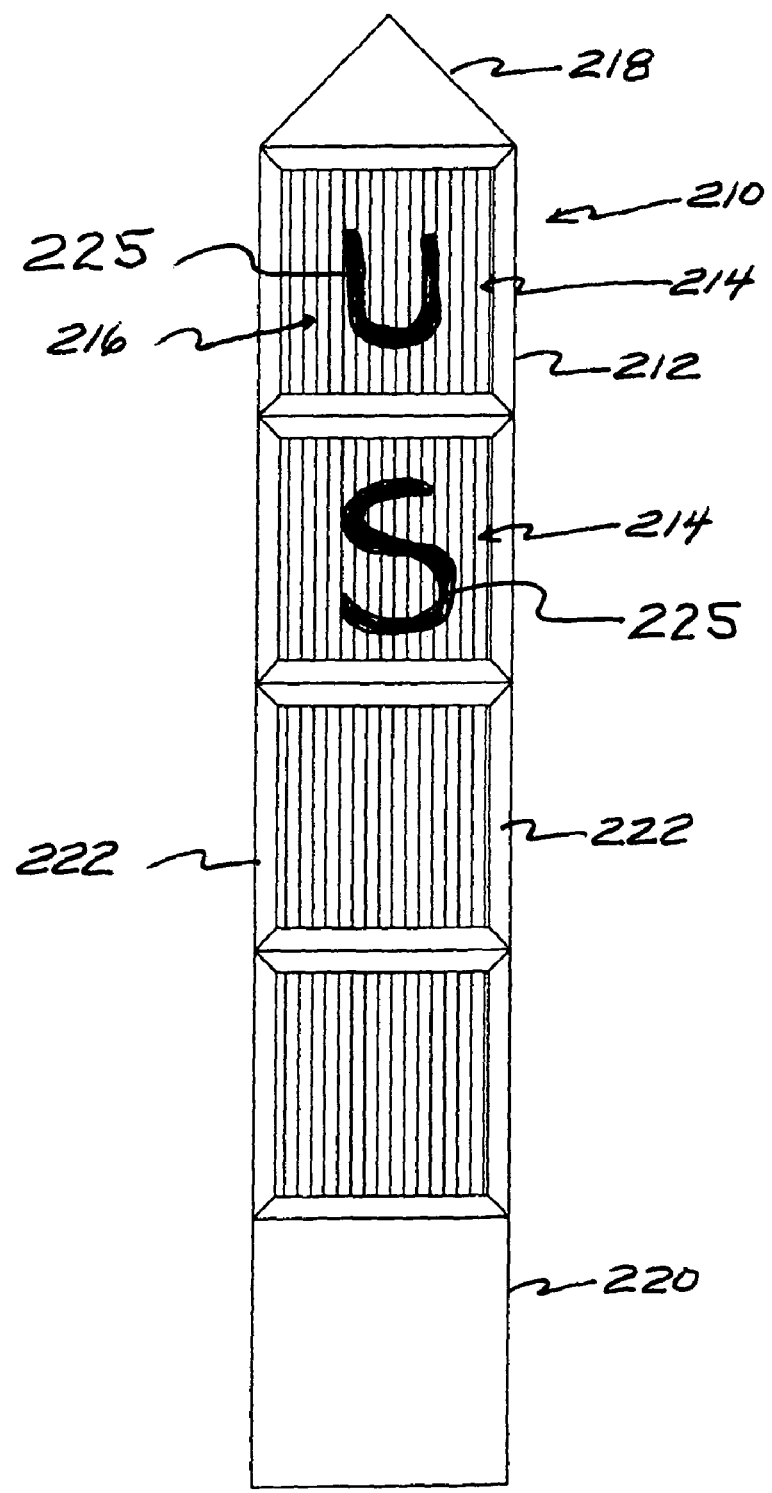
FIG. 15 is a schematic illustration of the wind generator system of FIG. 14 showing the blades and shaft within a housing.

In another preferred embodiment, as shown in FIGS. 14 and 15, the drive shaft 202 and blades 204 are enclosed within a housing 210. Referring to FIG. 15, as shown the housing 210 comprises a frame 212 having openings 214 wherein each opening 214 has a wind directional apparatus 216 that operates to adjust wind speed and to channel the wind W (FIG. 5) into along a desired flow pathway towards the plurality of blades 204. Preferably, the housing 210 is generally rectangular in shape having a top or roof 218 and base 220, and vertical sides 222. Preferably, at least one opening 214 is provided on each vertical side 222. In a preferred embodiment, as shown in FIG. 2, the wind directional apparatus 216 comprises a plurality of rotatable slats or louvers 224 that are operationally coupled to control rails 226 that are operated by one or more electric motor and control units 228 for rotating the slats 224. It should be understood that the housing 210 is not limited to being rectangular in shape but may have a variety of geometries having various number of vertical sides. For an exemplainary illustration, the housing can be formed in the shape of a pentagon. Mounted to the housing 210 is a wind speed and direction sensor or anemometer 230 that operates to detect and measure wind speed and direction. As previously described, the wind speed and direction sensor 230 is electrically coupled to a control apparatus having a microprocessor that receives signals from the wind speed and direction sensor 230 which then determines and provides signals to the electric motor and control units 228 to rotate the slats 224 to the desired position for directing airflow along a desired pathway to properly impinge the blades 204. The slats 224 further comprises images 225 thereon that change when the slats 224 rotate.

Figure 16:
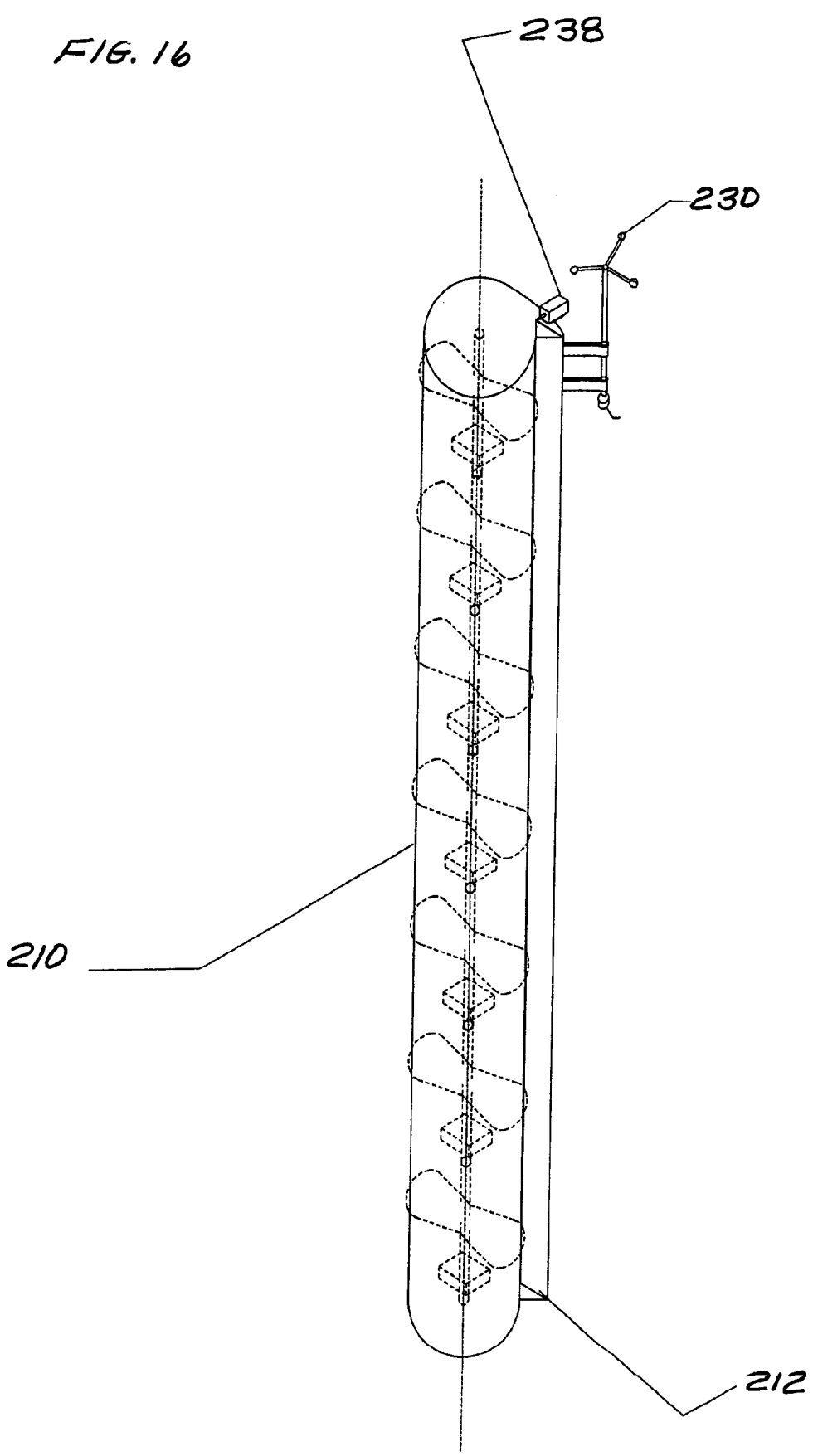
FIG. 16 is a schematic illustration showing another preferred embodiment of the invention showing a plurality of aligned or stacked blade stages enclosed within a housing having a wind intake ramp.
Figure 17:
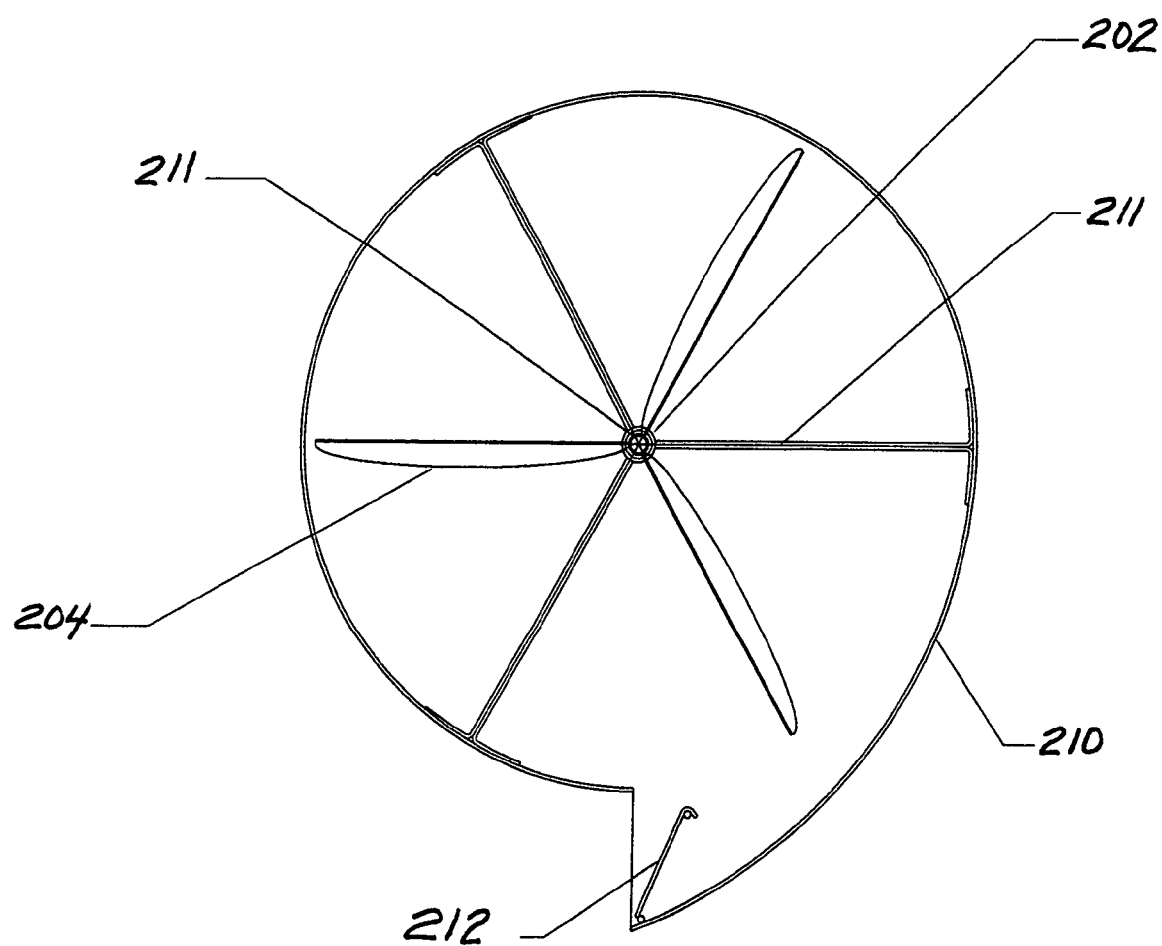
FIG. 17 is a schematic illustration showing a top view of the wind generator system of FIG. 16.
Figure 18:
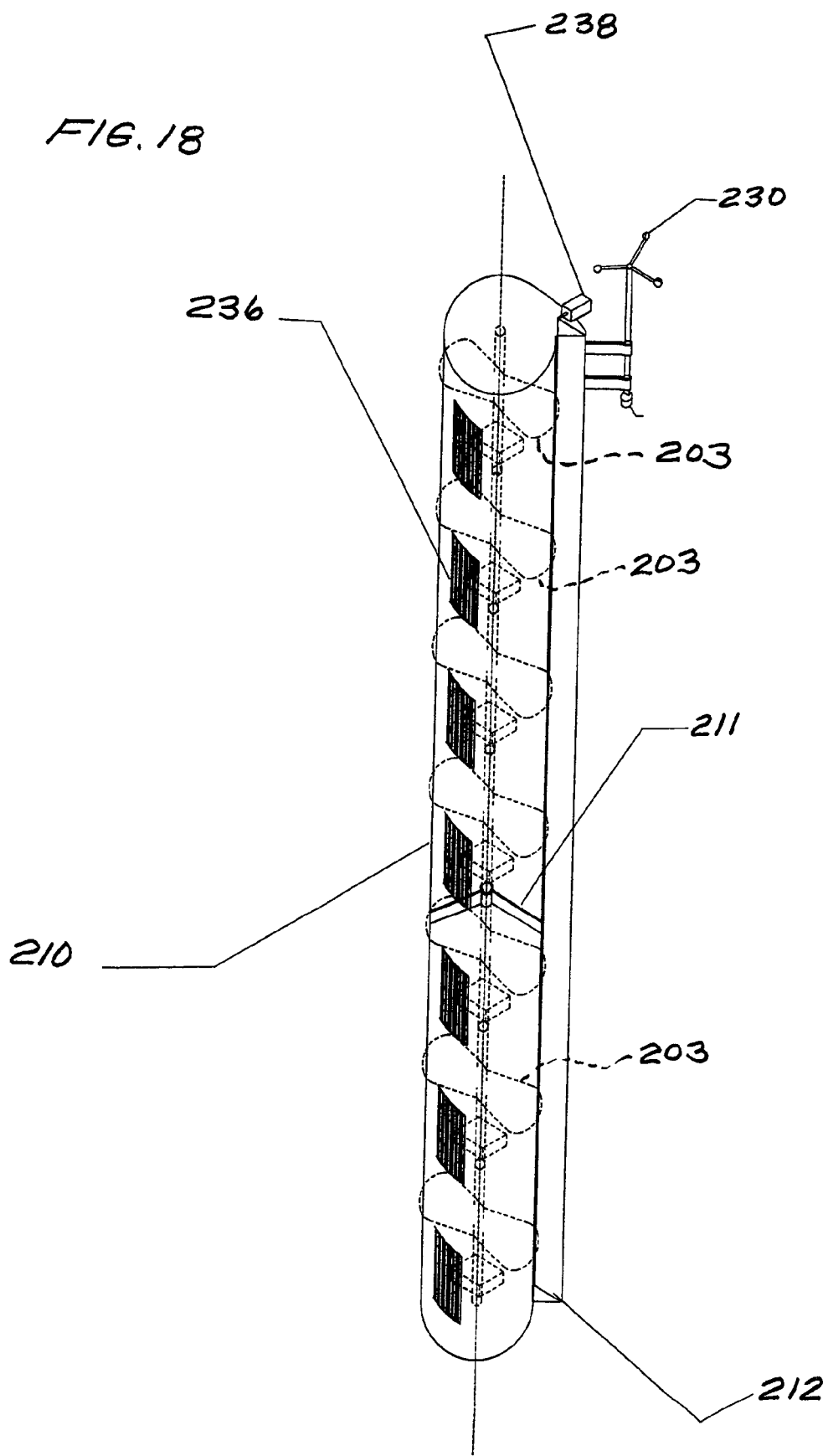
FIG. 18 is a schematic illustration of the wind generator system of FIG. 16 showing wind exhaust openings.

In another preferred embodiment as illustrated in FIGS. 16, 17 and 18, a plurality of blade stages 203 connected together by a common drive shaft 202 are enclosed within a housing 210 having supports 211 and which is rotatably mounted such that the housing can rotate in response to wind direction to optimize the wind entering through intake opening or ramp 212. In a preferred embodiment the intake opening 212 in the housing 210 operates as a wind intake or scoop and cooperates with one or more exhaust openings 236 that operate to expel air to optimize air flow through the housing as well as to provide pressure to rotate the wind generator system. Preferably, the intake opening 212 can be opened or closed by use of a linear displacement potentiometer 238 that cooperates with the wind speed and direction sensor 230 and a control apparatus, such as that previously described, to increase or decrease the size of the intake opening 212.

Figure 19:
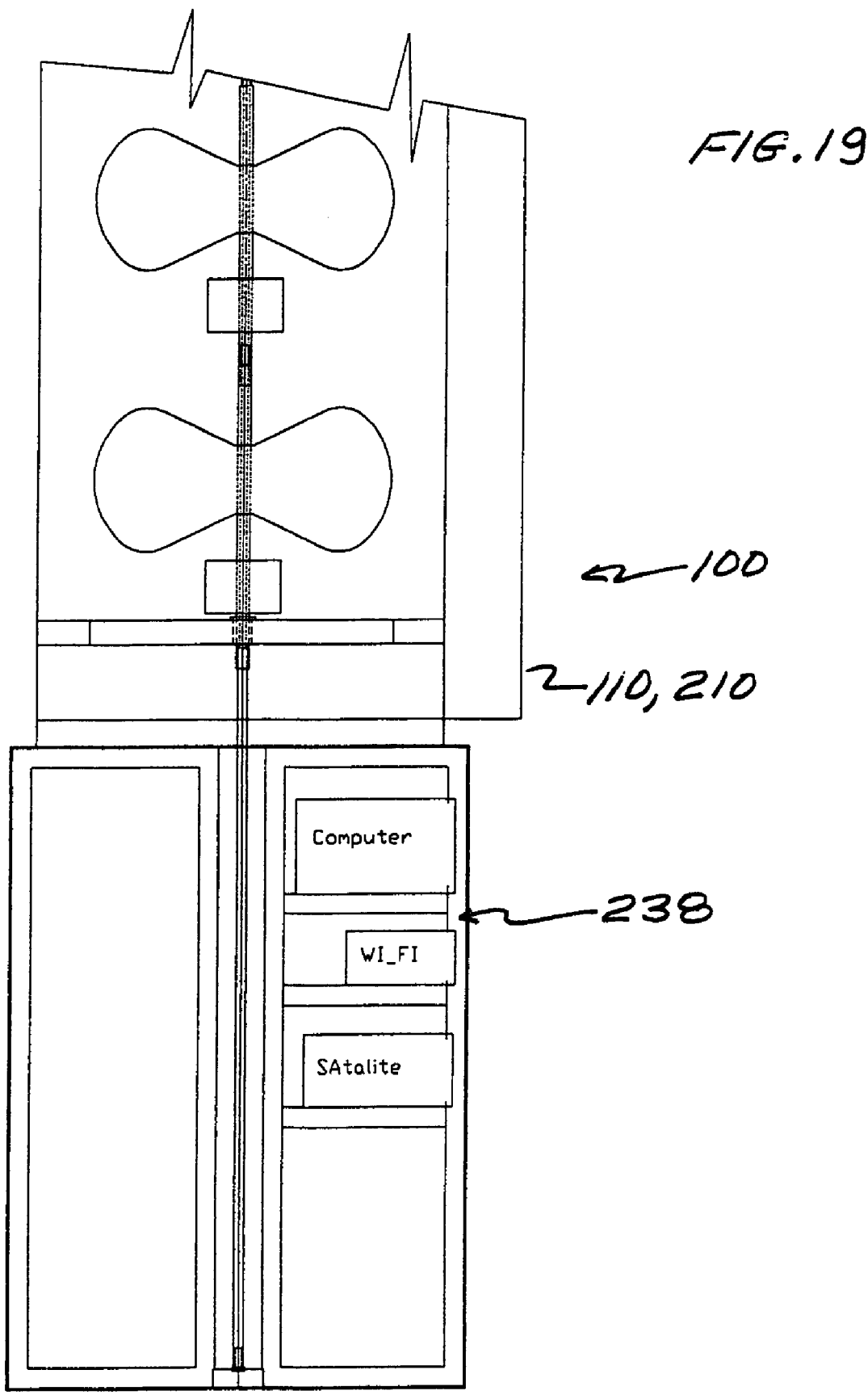

Referring to FIG. 19, in a preferred embodiment of the invention the wind generator system can be used to provide electric power for various applications. As an exemplary illustration, such systems can be mounted to a structure or be portable for emergency and/or remote location use. As shown in FIG. 19, a preferred embodiment of the wind generator system 100 is illustrated whereby the housing 110, 210, includes stand, rack mounting structures 238 for equipment, such as electrical equipment, battery systems, and the like. In another preferred embodiment, a portion of the exhaust airflow can be diverted, such as by vents or stators, to provide cooling for such equipment.

Figure 20:
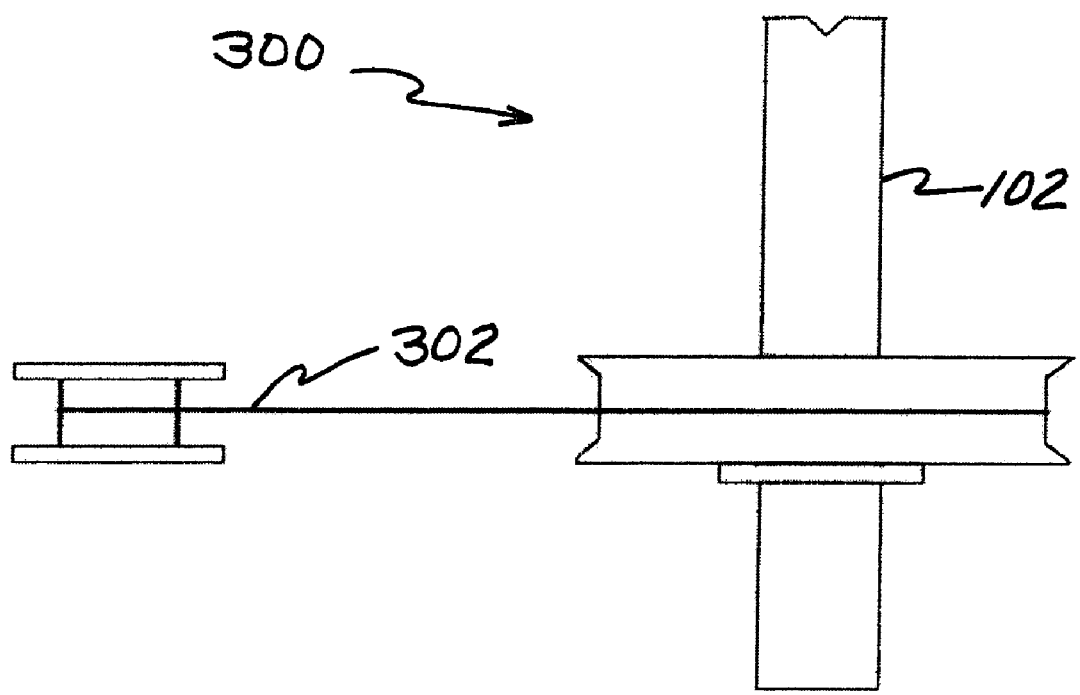
FIG. 20 is a schematic illustration of another preferred embodiment of the invention showing an energy enhancer element for increasing the rotation of the drive shaft.
Figure 21:
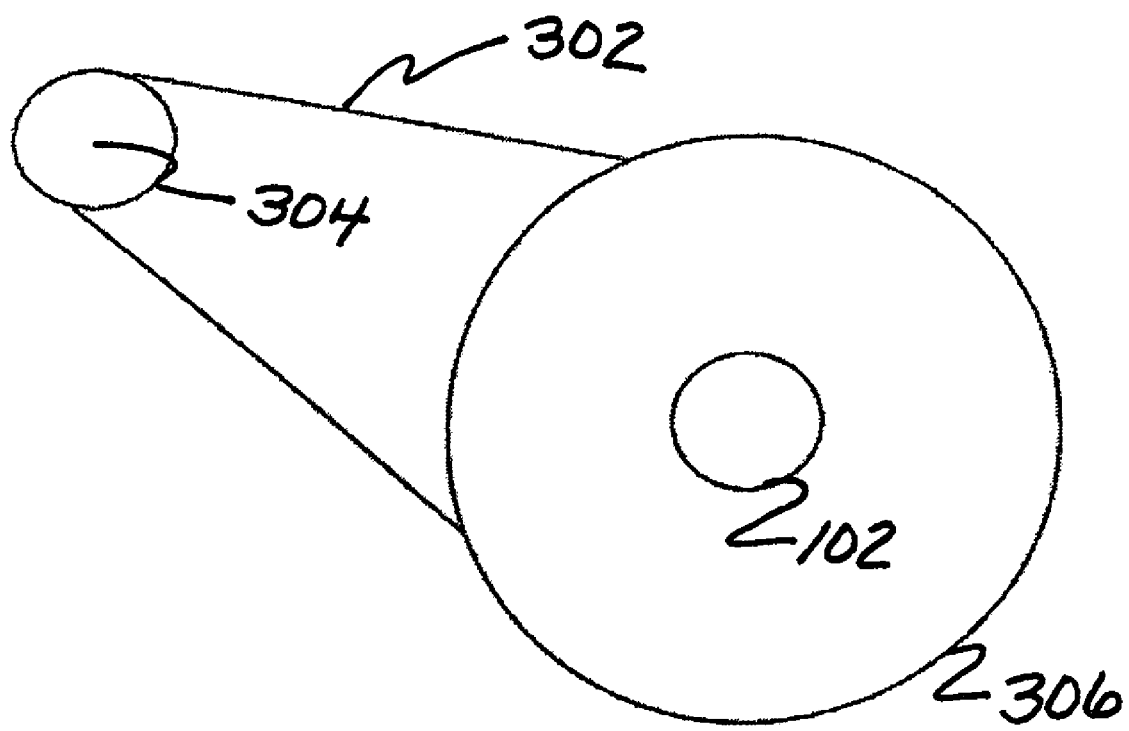
FIG. 21 is a schematic illustration showing the top view of the energy enhancer element of FIG. 20.

Referring to FIGS. 20 and 21, another preferred embodiment of the invention comprises an energy enhancer element 300 in the form of a wire or band 302 formed from a memory shaped alloy, such as a Nitinol. As shown, the wire or band 302 is placed around a first rotating wheel 304, which is electrically coupled to a heating circuit (not shown), and a second larger wheel 306 coupled to the drive shaft 102. When increased power is required, the heating circuit is activated causing the first rotating wheel 304 to heat. A portion of the wire or band 302 that is in contact with the first rotating wheel 304 is thereby heated bringing the memory shaped alloy above its transition temperature thereby creating a temperature differential along the wire or band 302 thereby shortening the heated side of the wire or band 302 causing rotational force to be applied to the second larger wheel 306 and drive shaft 102.

Figure 22:
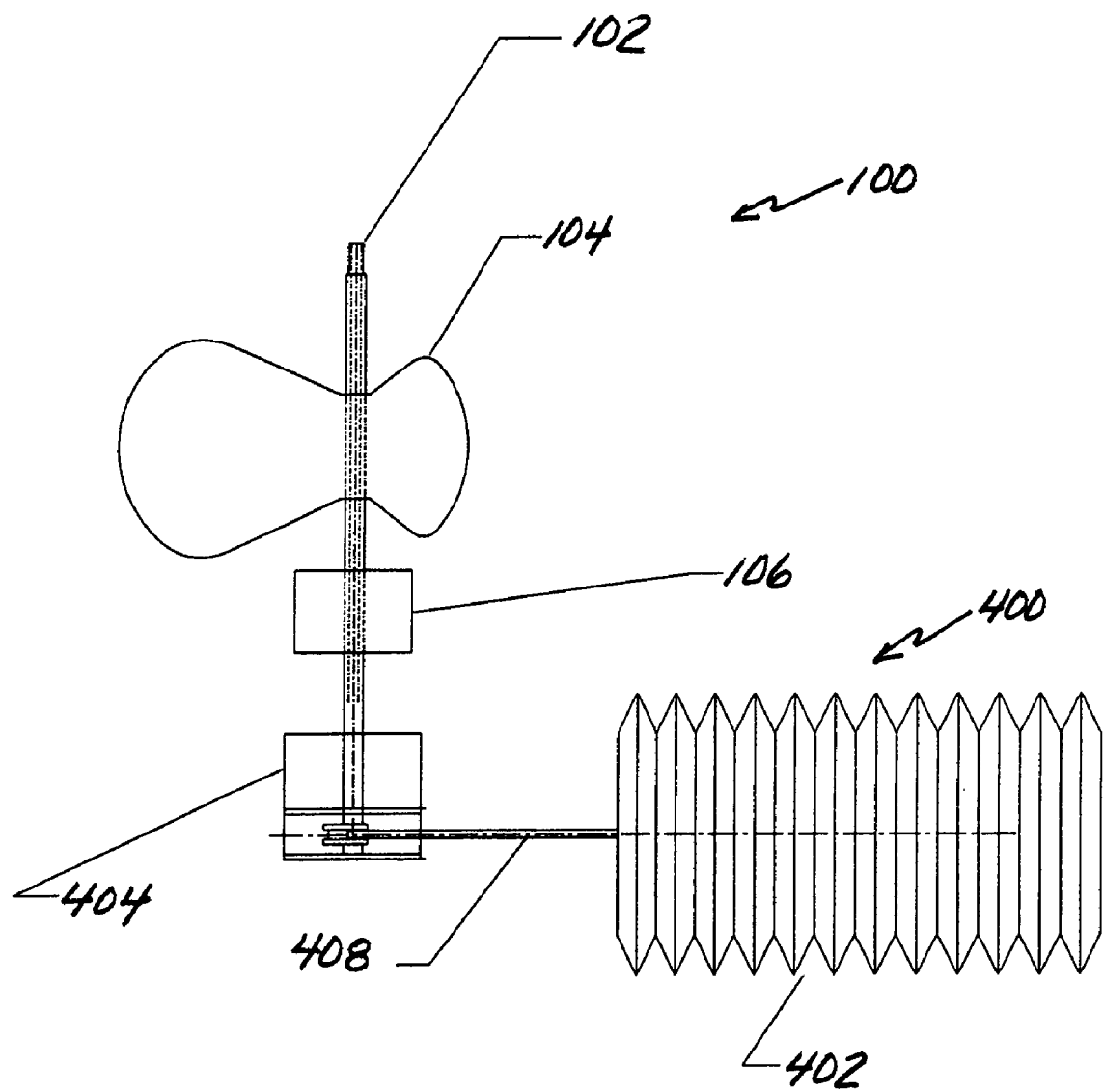
FIG. 22 is a schematic illustration of another preferred embodiment of the wind generator system having an energy storage system comprising a bellows system.

Referring to FIG. 22, in another preferred embodiment of the wind generator system 100 further comprises an energy storage system 400. Preferably, the energy storage system 400 is a mechanical energy storage system that eliminates the need for batteries and increases the efficiency of the system 100 by reducing loss of electricity such as through battery efficiencies and electrical resistance. One such energy storage system 400 is shown comprising a mechanical bellows 402 whereby rotational energy, such as that produced by rotation of drive shaft 102 is transferred such as by a mechanical coupling 404, such as a gearbox or another conventional transfer mechanism, that conventionally operates to engage with the drive shaft 102 to move a piston 408 to expand the bellows 402 to store the rotational energy as potential energy within the position of the bellows 402 and disengages when the bellows 402 obtains it maximum potential energy. To retrieve the energy, mechanical coupling 404 engages with the drive shaft 102 and the bellows 402 is allowed to compress or contract thereby moving the piston 408 to transfer the energy back through the mechanical coupling 404 to rotate the generator assembly 106.

Figure 23:
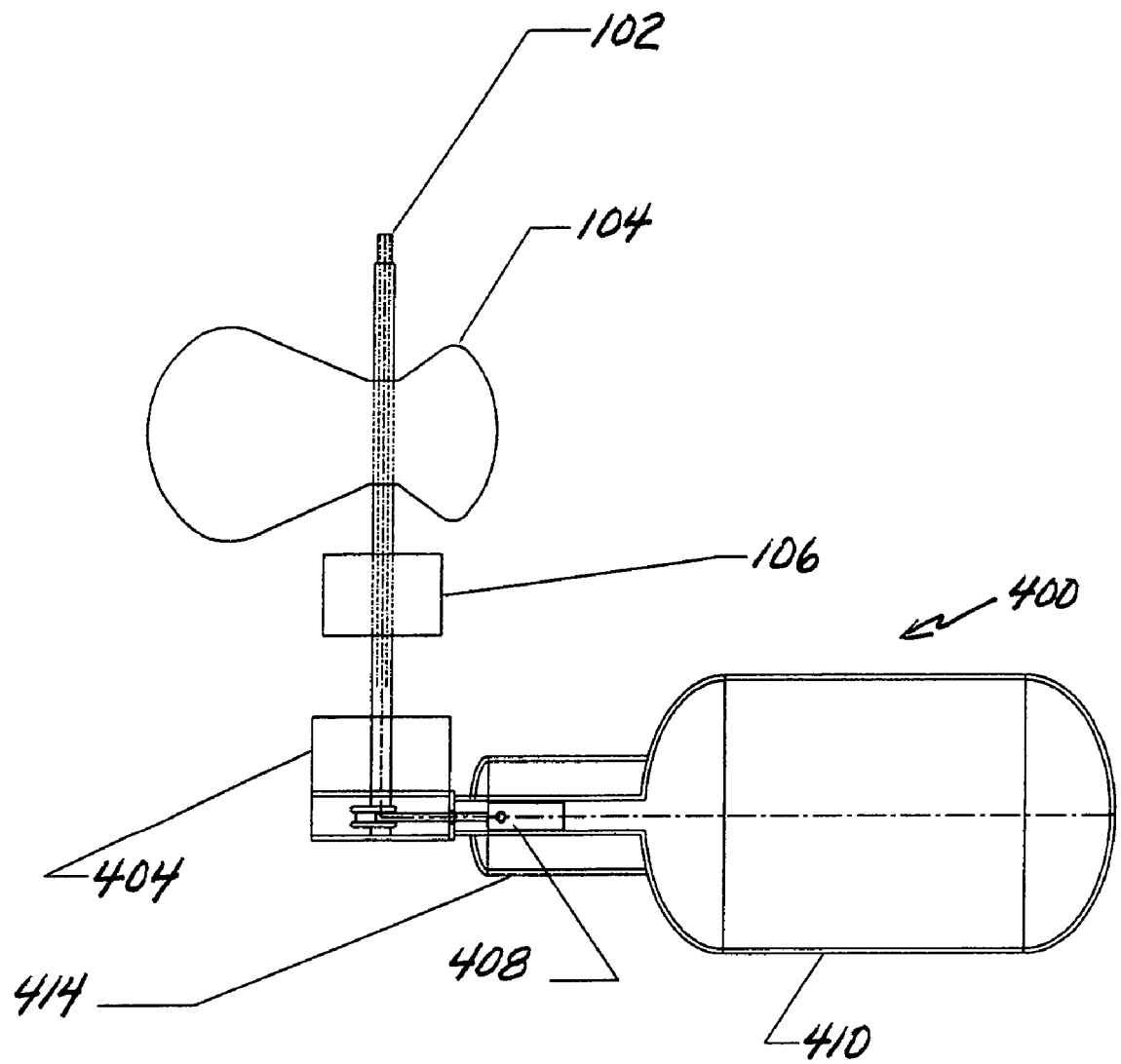
FIG. 23 is a schematic illustration of another preferred embodiment of the wind generator system having another preferred embodiment of an energy storage system comprising a pressurized fluid storage system.

In another preferred embodiment of the invention as shown in FIG. 23, the energy storage system 400 is a hydraulic storage system whereby rotational energy, such as that produced by rotation of drive shaft 102 is transferred such as my a mechanical coupling 404 to a hydraulic cylinder 410 such that a piston 408 operates to transfer fluid 412 from a pressurization reservoir 414 to the hydraulic cylinder 410 to store the rotational energy as potential energy. To retrieve the energy, the pressurized fluid within the hydraulic cylinder 410 is allowed to compress or contract thereby moving the piston 408 to transfer the energy back through the mechanical coupling 404 to rotate the generator assembly 106.

It should be understood that the energy storage system 400, may comprise any combination of hydraulic systems, bellows systems, and battery systems. Such systems can be used together or in banks whereby conventional mechanical switches between individual storage systems operate to transfer potential energy between systems.

It should now be understood to those skilled in the art that the wind generator system of the present application is easily constructed in modular form thereby reducing the time and cost needed to make repairs to the system. For the use of performance monitors and sensors reduces maintenance requirements and increases efficiency. Further, the wind generator system of the present application reduces the likelihood of damage resulting from high wind speeds often encountered by small wind generator systems without the need of relatively complex and expensive blade pitching devices, airfoil spoilers, blade tip breaks, braking means, and the like.

Further, it should also now be understood to those skilled in the art that the wind generator system of the present application is relatively acoustically quiet and aesthetically pleasing making them desirable for many residential applications.

It should also now be understood to those skilled in the art that the wind generator system of the present application can be used in a variety of applications. Systems can be incorporated into the exterior design of a structure, such as a building, such as along the roof, or as part of its landscaping, such as decorative structures. Further systems can be easily placed at locations having natural wind currents, such as between building structures or walls that operate as wind tunnels. By artistically or architecturally designing the housing, the wind generator system can be easily incorporated into an existing or future structure designs.

Although the foregoing invention has been described in some detail for purposes of clarity of understandings, it will be apparent that certain changes and modifications may be practiced within the scope of any claims. It should now be apparent that the various embodiments presented can be easily modified while keeping within the scope and spirit of the subject invention. Accordingly, it should be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

I claim:

1. A wind generator system comprising:
a rotor mounted to a drive shaft;
one or more blades attached to said rotor and extending radially outwardly from said rotor;
a generator assembly coupled to said drive shaft and effective for generating electrical power;
an energy enhancer element; and a housing having an inner chamber for receiving said rotor and said one or more blades; and
a mechanical energy storage system, wherein said mechanical energy storage system comprises a mechanical bellows whereby rotational energy produced by the rotation of said drive shaft is converted into potential energy and stored by said mechanical bellows; and
wherein said energy enhancer element is coupled to said rotor for increasing the rotational speed of the rotor during periods of low and no wind conditions.

2. The wind generator system of claim 1 further comprising sensing means for monitoring the electrical power output of the wind generator system.

3. The wind generator system of claim 1 further comprising sensing means for monitoring the operational efficiency of the wind generator system.

4. The wind generator system of claim 2 further comprising communication and control means coupled to said sensing means and whereby said communication and control means can communicate with an outside monitoring system.

5. The wind generator system of claim 1 wherein each of said blades comprises an aerodynamic adjustment element for adjusting the aerodynamic characteristic of each of said blades.

6. The wind generator system of claim 5 wherein said aerodynamic element is a thin film substrate.

7. The wind generator system of claim 5 wherein said aerodynamic element is a metallic coating substrate.

8. The wind generator system of claim 5 wherein said aerodynamic element is formed from a shaped memory alloy.

9. The wind generator of claim 8 wherein said shaped memory alloy is Nitinol.

10. The wind generator system of claim 1 wherein said blades comprises a photovoltaic substrate operable for generating electrical power.

11. The wind generator system of claim 10 wherein said photovoltaic substrate operates in response to infrared light.

12. A wind generator system comprising:
a rotor mounted to a drive shaft;
one or more blades attached to said rotor and extending radially outwardly from said rotor;
a generator assembly coupled to said drive shaft and effective for generating electrical power;
an energy enhancer element; and
a housing having an inner chamber for receiving said rotor and said one or more blades; and
wherein said energy enhancer element is coupled to said rotor for increasing the rotational speed of the rotor during periods of low wind;
wherein said energy enhancer element having a band coupled to said drive shaft;
and means for creating a temperature differential along a portion of said band; wherein said band is effective for increasing the rotational speed of said drive shaft when acted upon by said means for creating a temperature differential along a portion of said band.

13. The wind generator of claim 12 wherein said band is formed from a shaped memory alloy.

14. The wind generator system of claim 12 further comprising sensing means for monitoring the electrical power output of the wind generator system.

15. The wind generator system of claim 14 further comprising communication and control means coupled to said sensing means and whereby said communication and control means can communicate with an outside monitoring system.

16. The wind generator system of claim 12 further comprising sensing means for monitoring the operational efficiency of the wind generator system.

17. The wind generator system of claim 12 wherein each of said blades comprises an aerodynamic adjustment element for adjusting the aerodynamic characteristic of each of said blades.

18. The wind generator system of claim 17 wherein said aerodynamic element is a thin film substrate.

19. The wind generator system of claim 17 wherein said aerodynamic element is a metallic coating substrate.

20. The wind generator system of claim 17 wherein said aerodynamic element is formed from a Nitinol (NiTi) alloy.

21. The wind generator system of claim 12 wherein said blades comprises a photovoltaic substrate operable for generating electrical power.

22. The wind generator system of claim 21 wherein said photovoltaic substrate operates in response to infrared light.

* * * * *